US012073821B2

(12) United States Patent
Sherman et al.

(10) Patent No.: US 12,073,821 B2
(45) Date of Patent: Aug. 27, 2024

(54) SYSTEM AND METHODOLOGY FOR MODULATION OF DYNAMIC GAPS IN SPEECH

(71) Applicant: IGENTIFY LTD., Tirat HaCarmel (IL)

(72) Inventors: Zohar Sherman, Kerem Maharal (IL); Ori Inbar, Ramat Gan (IL)

(73) Assignee: IGENTIFY LTD., Tirat Hacarmel (IL)

( * ) Notice: Subject to any disclaimer, the term of this patent is extended or adjusted under 35 U.S.C. 154(b) by 289 days.

(21) Appl. No.: 17/428,528

(22) PCT Filed: Jan. 30, 2020

(86) PCT No.: PCT/IL2020/050117
§ 371 (c)(1),
(2) Date: Aug. 4, 2021

(87) PCT Pub. No.: WO2020/161697
PCT Pub. Date: Aug. 13, 2020

(65) Prior Publication Data
US 2022/0189500 A1 Jun. 16, 2022

Related U.S. Application Data

(60) Provisional application No. 62/801,158, filed on Feb. 5, 2019.

(51) Int. Cl.
*G10L 13/10* (2013.01)
*G06N 20/00* (2019.01)
(Continued)

(52) U.S. Cl.
CPC ............ *G10L 13/10* (2013.01); *G06N 20/00* (2019.01); *G10L 13/02* (2013.01); *G10L 21/045* (2013.01); *G10L 21/055* (2013.01)

(58) Field of Classification Search
CPC ...................................................... G06F 18/24
See application file for complete search history.

(56) References Cited

U.S. PATENT DOCUMENTS 5,682,501 A * 10/1997 Sharman ................. G10L 13/08
704/256.4
6,490,553 B2 * 12/2002 Van Thong ............ H04N 5/278
704/211
(Continued)

FOREIGN PATENT DOCUMENTS

EP 2009621 A1 12/2008
KR 20050018883 A 2/2005

OTHER PUBLICATIONS

Federico et al. "From Speech-to-Speech Translation to Automatic Dubbing". arXiv:2001.06785v1 [cs.CL] Jan. 19, 2020 (Year: 2020).*
(Continued)

*Primary Examiner* — Jesse S Pullias
(74) *Attorney, Agent, or Firm* — Browdy and Neimark, PLLC

(57) ABSTRACT

A system capable of speech gap modulation is configured to: receive at least one composite speech portion, which comprises at least one speech portion and at least one dynamic-gap portion, wherein the speech portion(s) comprising at least one variable-value speech portion, wherein the dynamic-gap portion(s) associated with a pause in speech; receive at least one synchronization point, wherein synchronization point(s) is associating a point in time in the composite speech portion(s) and a point in time in other media portion(s); and modulate dynamic-gap portion(s), based at least partially on the at variable-value speech portion(s), and on the point(s), thereby generating at least one modulated composite speech portion. This facilitates improved synchronization of the modulated composite speech portion(s) and the other media portion(s) at the synchronization point(s), when combining the other media portion(s) and the audio-format modulated composite speech portion(s) into a synchronized multimedia output.

20 Claims, 11 Drawing Sheets

| Accordion Type | Min Limit | Max Limit | Default Time | Priority Rank | Weights |
|---|---|---|---|---|---|
| Paragraph Change | 0.5 s | 5 s | 2.5 s | 1 | 45% |
| Double Period (..) * | 0.35 s | 4 s | 2.5 s | 2 | 30% |
| Period (.) | 0.25 s | 2.9 s | 2 s | 3 | 30% |
| Question Mark (?) | 0.25 s | 3 s | 2 s | 3 | |
| Colon (:) | 0.2 s | 2 s | 1 s | 4 | 15% |
| Semicolon (;) | 0.18 s | 1.3 s | 0.8 s | 5 | |
| Comma (,) | 0.1 s | 0.9 s | 0.6 s | 6 | |
| Space | 0.01 s | 0.1 s | 0.05 s | 7 | 10% |
| Syllable break | 0.003 s | 0.01 s | 0.005 s | 8 | |
| Other ... | ... | .... | ... | ... | |

\* Administrator-Defined Accordion

(51) Int. Cl.
*G10L 13/02* (2013.01)
*G10L 21/045* (2013.01)
*G10L 21/055* (2013.01)

(56) References Cited

U.S. PATENT DOCUMENTS

| | | | |
|---|---|---|---|
| 7,058,889 | B2 | 6/2006 | Trovato et al. |
| 7,123,696 | B2 | 10/2006 | Lowe |
| 7,133,535 | B2 | 11/2006 | Huang et al. |
| RE42,647 | E | 8/2011 | Lee et al. |
| 8,224,652 | B2 * | 7/2012 | Wang ............... G10L 13/00 |
| | | | 704/260 |
| 8,243,761 | B2 * | 8/2012 | Heikkinen ............ G10L 21/04 |
| | | | 370/516 |
| 8,913,189 | B1 | 12/2014 | Mincher et al. |
| 10,276,185 | B1 * | 4/2019 | Ma ..................... G10L 25/78 |
| 2002/0111812 | A1 * | 8/2002 | Buchholz ............ G10L 19/012 |
| | | | 704/278 |
| 2003/0163316 | A1 * | 8/2003 | Addison ............... G10L 13/10 |
| | | | 704/260 |
| 2010/0066742 | A1 * | 3/2010 | Qian ..................... G10L 13/10 |
| | | | 345/440.1 |
| 2011/0060590 | A1 * | 3/2011 | Katae ................... G11B 27/034 |
| | | | 704/260 |
| 2015/0332732 | A1 | 11/2015 | Gilson et al. |

OTHER PUBLICATIONS

Support.office.com/en-us/article/change-the-spaces-between-text-e9b96011-1c42-45c0-ad8f-e8a6e4a33462, Change the spaces between text, pp. 1-6, Jan. 21, 2021.
Www.rose-hulman.edu/class/csse/csse221/200910/Projects/Markov/justification.html, Text Justification Algorithm, pp. 1-2, Oct. 29, 2020.

* cited by examiner

| Accordion Type | Min Limit | Max Limit | Default Time | Priority Rank | Weights |
|---|---|---|---|---|---|
| Paragraph Change | 0.5 s | 5 s | 2.5 s | 1 | 45% |
| Double Period (..) * | 0.35 s | 4 s | 2.5 s | 2 | |
| Period (.) | 0.25 s | 2.9 s | 2 s | 3 | 30% |
| Question Mark (?) | 0.25 s | 3 s | 2 s | 3 | |
| Colon (:) | 0.2 s | 2 s | 1 s | 4 | |
| Semicolon (;) | 0.18 s | 1.3 s | 0.8 s | 5 | 15% |
| Comma (,) | 0.1 s | 0.9 s | 0.6 s | 6 | |
| Space | 0.01 s | 0.1 s | 0.05 s | 7 | |
| Syllable break | 0.003 s | 0.01 s | 0.005 s | 8 | 10% |
| Other ... | ... | ... | ... | ... | |

\* Administrator-Defined Accordion

| Word/Mark | Speech Length | Accordion Changes |
|---|---|---|
| <lead> | 0.4 sec | (Note: empty space at start) |
| Hi David | 0.3 s | |
| < , > | 0.6 s | no change from default |
| here | 0.3 s | |
| <space> | 0.05 s | no change |
| are | 0.2 s | |
| <space> | 0.05 s | no change |
| your | 0.3 s | |
| <space> | 0.05 s | no change |
| results | SUM = 2.25 sec | (NOTE: Synch point with video) |

525

| Word/Mark | Speech Length | Accordion Changes |
|---|---|---|
| <lead> | 0.4 sec | |
| Hi Alexandria | 0.9 s | (note: longer name, by 0.6 sec) |
| < , > | 0.1 s | compressed – remove 0.5 sec |
| here | 0.3 s | |
| <space> | 0.02 s | compressed – remove 0.03 sec |
| are | 0.2 s | |
| <space> | 0.02 s | compressed – remove 0.03 sec |
| your | 0.3 s | |
| <space> | 0.01 s | compressed – remove 0.04 sec |
| results | SUM = 2.25 sec | |

535

| Word/Mark | Speech Length | Accordion Changes |
|---|---|---|
| <lead> | 0.4 sec | |
| Hi Sue | 0.1 s | (note: shorter name, by 0.2 sec) |
| < , > | 0.7 s | expanded – add 0.1 sec |
| here | 0.3 s | |
| <space> | 0.08 s | expanded – add 0.03 sec |
| are | 0.2 s | |
| <space> | 0.08 s | expanded – add 0.03 sec |
| your | 0.3 s | |
| <space> | 0.09 s | expanded – add 0.04 sec |
| results | SUM = 2.25 sec | |

Fig. 5B

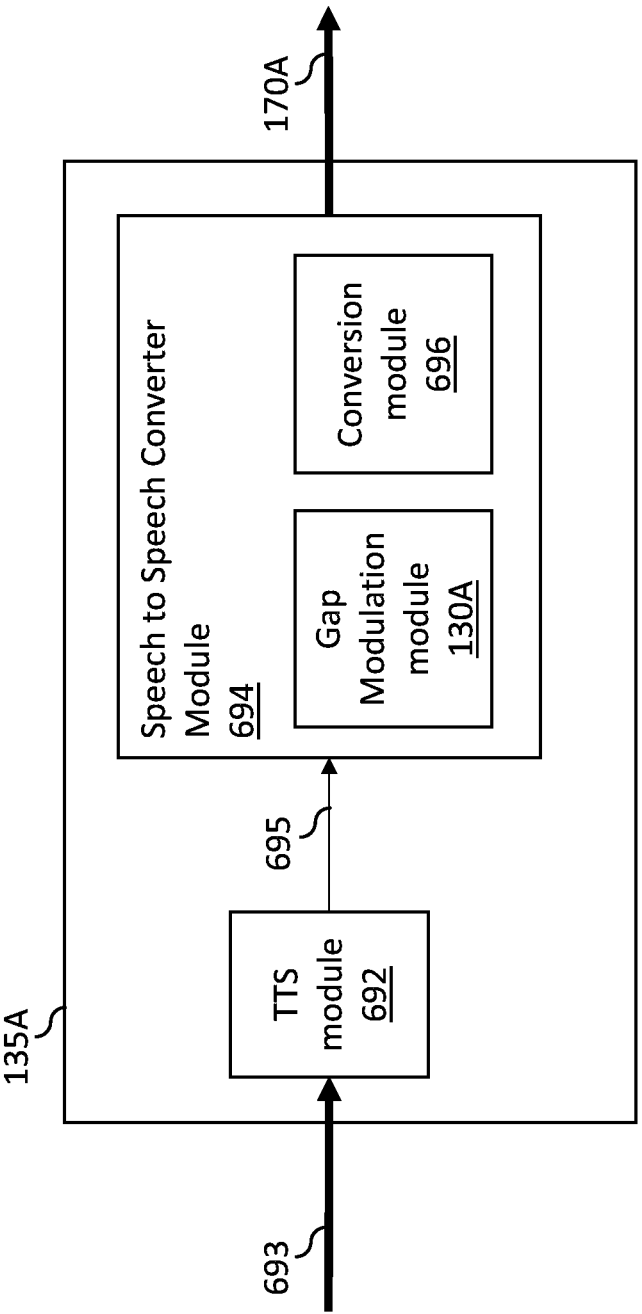

SYSTEM AND METHODOLOGY FOR MODULATION OF DYNAMIC GAPS IN SPEECH

TECHNOLOGICAL FIELD

The presently disclosed subject matter relates to the field of multi-media, and more specifically to speech synchronization.

BACKGROUND

In some examples, when dynamically generating a personalized multi-media item, real time inputs associated with the end-user (after being converted into audio speech media) are to be merged with other media. For example, the audio speech media are to be merged into a video media template, in as seamless a manner as possible, to produce as near-perfect and synchronized multimedia output as possible—preferably one that is not noticeable or detectable to a human user.

In some examples, audio speech media of varying lengths are generated using a Text-to-Speech (TTS) synthesizer. The length of the audio speech media may vary depending on the personalization content. In the case of video multi-media, ideally the audio speech media and the video media should be in synch. That is, a video component should appear in the video ideally at exactly the same instant when the corresponding speech audio media is heard. However, in practical scenarios, this is often not the case. For example: in the greeting section (at the beginning) of the multimedia, "hello Tom" or "hello Sue" requires less TTS narration time than "hello Alexandria" or "hello Jacqueline". Hence, in some cases the video components in the video media that follow the greeting section, will go out of synch. In some cases, such an out-of-synch problem provides a comparatively unpleasant experience to the viewers of the video who are also listening to the audio speech. For example, the video stream of a multi-media content item may show a person speaking, with lips moving, but the audio corresponding to the lip movements has already been played or alternatively has not yet been played.

SUMMARY OF THE INVENTION

In accordance with a first aspect of the invention, there is presented a system capable of speech gap modulation, comprising a processing circuitry and configured to:
(a) receive at least one composite speech portion, the at least one composite speech portion comprising at least one speech portion and at least one dynamic-gap portion, wherein the at least one speech portion comprises at least one variable-value speech portion, wherein the at least one dynamic-gap portion is associated with a pause in speech;
(b) receive at least one synchronization point, wherein the at least one synchronization point is associating a point in time in the at least one composite speech portion and a point in time in an at least one other media portion; and
(c) modulate the at least one dynamic-gap portion, based at least partially on the at least one variable-value speech portion, and on the at least one synchronization point, thereby generating at least one modulated composite speech portion,
thereby facilitating improved synchronization of the at least one modulated composite speech portion and the at least one other media portion at the at least one synchronization point, when combining the at least one other media portion and the audio-format modulated composite speech portion into a synchronized multimedia output.

In addition to the above features, the system according to this aspect of the presently disclosed subject matter can include one or more of features (i) to (xliv) listed below, in any desired combination or permutation which is technically possible:

(i) wherein the modulation of the least one dynamic-gap portion comprises at least one of increasing gap playback time and decreasing gap playback time associated with the at least one dynamic-gap portion.

(ii) wherein the modulation of the least one dynamic-gap portion comprises determining an estimated speech portion playback time of the at least one variable-value speech portion.

(iii) wherein the determining an estimated speech portion playback time of the at least one variable-value speech portion is based on a machine learning database.

(iv) wherein the at least one speech portion comprises at least one fixed-value speech portion.

(v) wherein the modulation of the least one dynamic-gap portion comprises determining an estimated speech portion playback time of the at least one fixed-value speech portion.

(vi) wherein the determining an estimated speech portion playback time of the at least one fixed-value speech portion is based on a machine learning database.

(vii) wherein the at least one composite speech portion associated with at least one composite speech portion template, the at least one composite speech portion template defining relative positions of the at least one variable-value speech portion, the at least one fixed-value speech portion and the at least one dynamic-gap portion.

(viii) wherein the at least one composite speech portion template comprises a text template.

(ix) wherein the modulation of the least one dynamic-gap portion comprises at least one of increasing gap playback time and decreasing gap playback time associated with the at least one dynamic-gap portion.

(x) wherein the decreasing the gap playback time being performed in response to an estimated playback time of a part of the composite speech portion being longer than a corresponding other-media playback time associated with the at least one synchronization point,
wherein the increasing the gap playback time being performed in response to the estimated playback time of the part of the composite speech portion being shorter than a corresponding other-media playback time associated with the at least one synchronization point,
wherein the part of the composite speech portion comprises the at least one variable-value speech portion,
wherein the estimated playback time of the part of the composite speech portion is based on the estimated speech portion playback time of the at least one variable-value speech portion.

(xi) wherein the at least one variable-value speech portion comprises at least one variable-value speech field, wherein the estimated speech portion playback time of the at least one variable-value speech portion is based on an estimated speech field playback time of the at least one variable-value speech field.

(xii) wherein each dynamic-gap portion of the at least one dynamic-gap portion is associated with a dynamic-gap type, wherein the dynamic-gap type is associated with a minimum gap playback time and a maximum gap playback time, wherein the increasing the gap playback time is limited by the maximum playback time, wherein the decreasing the gap playback time is limited by the minimum playback time.

(xiii) wherein the minimum gap playback time, and the maximum gap playback time associated with the dynamic-gap type, are configurable.

(xiv) wherein the at least one dynamic-gap portion comprises a plurality of dynamic-gap portions,
wherein the at least one dynamic-gap type comprises a plurality of dynamic-gap types,
wherein at least two dynamic-gap portions of the plurality of dynamic-gap portions are associated with at least two different dynamic-gap types of the plurality of dynamic-gap types,
wherein the modulation of the least one dynamic-gap portion is based on a priority associated with each dynamic-gap type of the plurality of dynamic-gap types.

(xv) wherein the priority associated with each dynamic-gap type is configurable.

(xvi) wherein the at least one dynamic-gap portion comprises a plurality of dynamic-gap portions,
wherein the at least one dynamic-gap type comprises a plurality of dynamic-gap types,
wherein at least two dynamic-gap portions of the plurality of dynamic-gap portions are associated with at least two different dynamic-gap types of the plurality of dynamic-gap types,
wherein the modulation of the least one dynamic-gap portion is based on a weight associated with each dynamic-gap type of the plurality of dynamic-gap types.

(xvii) wherein the weight associated with each dynamic-gap type is configurable.

(xviii) wherein the at least one synchronization point comprises a plurality of synchronization points,
wherein the modulation of the least one dynamic-gap portion is based on maximizing the number of synchronization points for which the improved synchronization will be facilitated.

(xix) wherein the modulation of the least one dynamic-gap portion is based on maximizing the degree of synchronization of the at least one synchronization point.

(xx) wherein the at least one composite speech portion comprises a text-format composite speech portion.

(xxi) wherein the at least one modulated composite speech portion comprises a text-format modulated composite speech portion.

(xxii) wherein the system further configured to:
(d) send the text-format modulated composite speech portion to a Text-to-Speech (TTS) synthesizer for generation of an audio-format modulated composite speech portion.

(xxiii) wherein the text-format modulated composite speech portion is of a Synthesized Speech Markup Language (SSML) format.

(xxiv) wherein the at least one composite speech portion comprises an audio-format composite speech portion.

(xxv) wherein the at least one modulated composite speech portion comprises an audio-format modulated composite speech portion.

(xxvi) wherein the audio-format modulated composite speech portion is stored in a data store.

(xxvii) wherein said step (a) further comprises receiving the at least one other media portion, and wherein the system is further configured to:
(e) combine the at least one other media portion and the audio-format modulated composite speech portion into a synchronized multimedia output, wherein the synchronized multimedia output is at least one of a file and a stream, wherein the synchronized multimedia output is capable of presentation to user.

(xxviii) the at least one other media portion is associated with at least one other-media template, wherein the at least one synchronization point is associated with the at least one other-media template.

(xxix) wherein the at least one other-media template is associated with at least one personal user asset, the at least one other-media template defining the relative position of media indicative of the at least one personal user asset within the at least one other media portion.

(xxx) wherein the at least one personal user asset comprises at least one of: user picture, user location, weather information associated with the user, time of day information associated with the user, and test results associated with the user.

(xxxi) wherein the test results comprise medical test results.

(xxxii) wherein the at least one personal user asset is stored in a data store.

(xxxiii) wherein the at least one other media portion comprises at least one of video and image slide-show.

(xxxiv) wherein the at least one other media portion comprises movement of at least one object.

(xxxv) wherein the at least one dynamic-gap portion comprises at least one of a punctuation mark, a space, a syllable break, a phoneme break and a custom-defined gap.

(xxxvi) wherein the custom-defined gap is based on administrator configuration.

(xxxvii) wherein the at least one speech portion comprises at least one of sentences, phrases, words, syllables and phonemes.

(xxxviii) wherein the at least one variable-value speech portion is user-specific.

(xxxix) wherein the at least one variable-value speech portion is based on a user input.

(xl) wherein the at least one variable-value speech portion is at least partly learned from social media.

(xli) wherein the at least one variable-value speech portion is based at least partly on user-specific health databases.

(xlii) wherein the user-specific health databases comprise Electronic Medical Records (EMR).

(xliii) wherein the wherein the system is further configured to:
(f) populate the machine learning database with estimated playback times of text portions, the populating comprising:
A. receiving a learning set of text portions;
B. sending to a TTS synthesizer a text portion of the learning set of text portions;
C. receiving from the TTS synthesizer an audio output; and
D. storing in the machine learning database an association of the length of the audio output with the text portion;
E. repeating said steps (B) through (D) for at least the next text portion of the learning set of text portions,
the populating of the machine learning database facilitating the determining of the estimated Speech Portion playback time.

(xliv) wherein the association of the length of the audio output with the text portion comprises a modified association.

In accordance with a second aspect of the invention, there is presented a system capable of speech gap modulation, comprising a processing circuitry and configured to:

(a) receive at least one composite speech portion, the at least one composite speech portion comprising at least one speech portion and at least one dynamic-gap portion, wherein the at least one speech portion comprises at least one variable-value speech portion, wherein the at least dynamic-gap portion associated with a pause in speech, wherein the at least one composite speech portion comprises a text-format composite speech portion;

(b) receive at least one synchronization point, wherein the at least one synchronization point is associating a point in time in the at least one composite speech portion and a point in time in an at least one other media portion; and (c) modulate the at least one dynamic-gap portion, based at least partially on the at least one variable-value speech portion, and on the at least one synchronization point, thereby generating at least one modulated composite speech portion, wherein the at least one modulated composite speech portion comprises a text-format modulated composite speech portion, thereby facilitating improved synchronization of the at least one modulated composite speech portion and the at least one other media portion at the at least one synchronization point, when combining the at least one other media portion and the audio-format modulated composite speech portion into a synchronized multimedia output.

The above aspect can optionally further comprise one or more of features (i) to (xliv) listed above, mutatis mutandis, in any technically possible combination or permutation.

In accordance with a third aspect of the invention, there is presented a system capable of speech gap modulation, comprising a processing circuitry and configured to:

(a) receive at least one composite speech portion, the at least one composite speech portion comprising at least one speech portion and at least one dynamic-gap portion, wherein the at least one speech portion comprises at least one variable-value speech portion, wherein the at least dynamic-gap portion is associated with a pause in speech, wherein the at least one composite speech portion comprises an audio-format composite speech portion;

(b) receive at least one synchronization point, wherein the at least one synchronization point is associating a point in time in the at least one composite speech portion and a point in time in an at least one other media portion; and (c) modulate the at least one dynamic-gap portion, based at least partially on the at least one variable-value speech portion, and on the at least one synchronization point, thereby generating at least one modulated composite speech portion, wherein the at least one modulated composite speech portion comprises an audio-format modulated composite speech portion, thereby facilitating improved synchronization of the at least one modulated composite speech portion and the at least one other media portion at the at least one synchronization point, when combining the at least one other media portion and the audio-format modulated composite speech portion into a synchronized multimedia output.

The above aspect can optionally further comprise one or more of features (i) to (xliv) listed above, mutatis mutandis, in any technically possible combination or permutation.

According to another aspect of the presently disclosed subject matter there is presented the method performed by the system of any of the above aspects.

According to another aspect of the presently disclosed subject matter there is presented a non-transitory program storage device readable by machine, tangibly embodying a program of instructions that, when executed by a computer, cause the computer to perform any of the above methods.

The computerized methods, and the non-transitory computer readable storage media, disclosed herein according to various aspects, can optionally further comprise one or more of features (i) to (xliv) listed above, mutatis mutandis, in any technically possible combination or permutation.

BRIEF DESCRIPTION OF THE DRAWINGS

In order to understand the presently disclosed subject matter and to see how it can be carried out in practice, examples will now be described, by way of non-limiting example only, with reference to the accompanying drawings, in which:

FIG. 4 illustrates one generalized example configuration for multi-media synchronization solutions, in accordance with certain embodiments of the presently disclosed subject matter.

FIG. 5B illustrates a generalized example of dynamic-gap modulation, in accordance with certain embodiments of the presently disclosed subject matter.

FIG. 6B illustrates a generalized example schematic diagram of a gap modulation system within a TTS system, in accordance with certain embodiments of the presently disclosed subject matter.

DETAILED DESCRIPTION OF THE DRAWINGS

Figure 1:
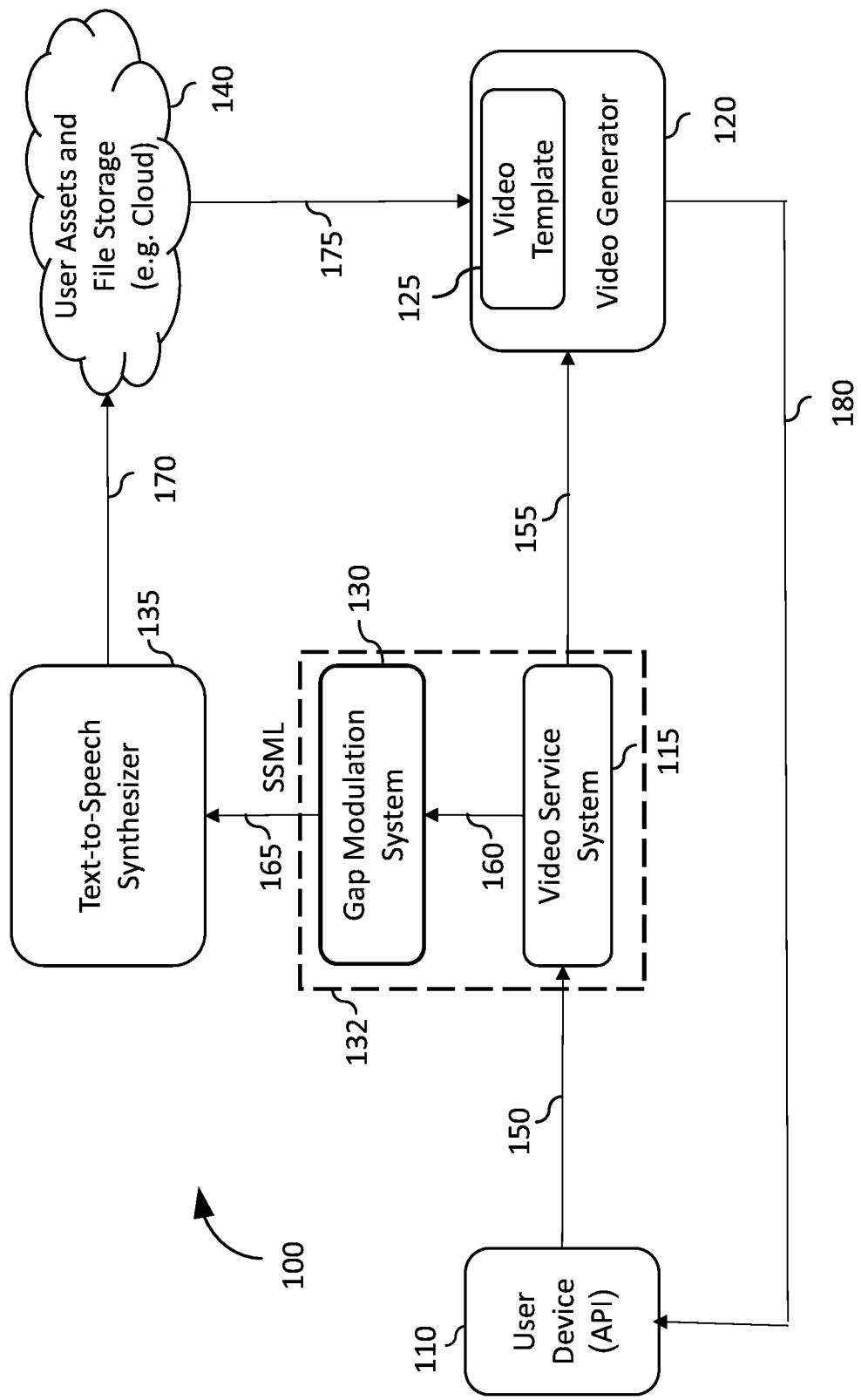
FIG. 1 illustrates a generalized architecture for multi-media synchronization, in accordance with certain embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, circuits and protocols have not been described in detail so as not to obscure the presently disclosed subject matter.

Unless specifically stated otherwise, as apparent from the following discussions, it is appreciated that throughout the specification discussions utilizing terms such as "receiving", "modulating", "synchronizing", or the like, include action(s) and/or processes of a computer that manipulate and/or transform data into other data, said data represented as physical quantities, e.g. such as electronic or mechanical quantities, and/or said data representing the physical objects. The term "computer" should be expansively construed to cover any kind of hardware-based electronic device with data processing capabilities, including, by way of non-limiting example, a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), any other electronic computing device, including, by way of non-limiting example, the processing circuitry therein, such as for example the processing circuitry 610 (further detailed herein with regard to FIG. 6A), disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof should be construed as conveying that one or more examples of the subject matter may include, while one or more other examples of the subject matter may not necessarily include, certain methods, procedures, components and features. Thus, such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that the teachings of the presently disclosed subject matter are not bound by what is described with reference to any of the figures or described in other documents referenced in this application.

Bearing this in mind, attention is now drawn to FIG. 1, illustrating a generalized architecture for multi-media synchronization, in accordance with certain embodiments of the presently disclosed subject matter. The figure depicts one example of a system and network architecture 100, and a flow of the multi-media service generation.

The depicted example system 100 includes a gap modulation system 130, e.g. a server, that is capable of speech gap modulation, and that is configured to:
  (a) receive input composite speech portion(s), which include one or more speech portions and one or more dynamic-gap portions, where the speech portions include one or more variable-value speech portions, and where the dynamic-gap portions are associated with a pause in speech;
  (b) receive one or more synchronization points, which associate a point in time in the composite speech portion(s) and a point in time in one or more other media portions; and
  (c) modulate the dynamic-gap portion(s), based on the variable-value speech portion(s), thereby generating modulated composite speech portion(s).

In some examples, the speech portions of the composite speech portion(s) also include fixed-value speech portion(s). Examples of speech portions include sentences, phrases, words, syllables and phonemes. Non-limiting examples of dynamic-gap portions include punctuation such as periods, commas, and a new paragraph. These punctuation marks are often associated with pause in speech. In some cases, a method such as the above can facilitate improved synchronization of the modulated composite speech portion(s) and the other media portion(s) at one or more of the synchronization point(s), when combining the at least one other media portion and the audio-format modulated composite speech portion into a synchronized multimedia output.

In some examples, the dynamic-gap modulation process includes determining estimated playback times of fixed-value speech portions and of variable-value speech portions. In some examples, this determination can utilize a machine learning database. The system can in some examples populate the machine learning database with estimated playback times of text portions, where the steps to populate the database include:
  i. receiving a learning set of text portions;
  ii. sending to a TTS synthesizer a text portion of the learning set of text portions;

iii. receiving from the TTS synthesizer an audio output;
iv. storing in the machine learning database an association of the length of the audio output with the text portion; and
v. repeating the steps (i) through (iv) for other text portions of the learning set.

The example service depicted in FIG. 1 is a video service, which provides a user with a personalized multi-media output that includes video, and also includes audio that is synchronized with the video. The audio component of the output is in some examples personalized, customized or otherwise variable, in that the text to be output and played back as audio speech is not fixed. For example, the text to be spoken may include the user name, user identification (ID) number, age, gender, user address or other user location information, school attended, place of work, and any other personal or otherwise varying information. In some examples, the video component of the output is also personalized, customized or otherwise variable, in that images displayed in the video include content specific to the user. In other examples, the video component is not personalized, and only the spoken audio "narration" component associated with the video has content specific to the user.

In an example used in this disclosure, for purposes of exposition, the user is a medical patient who is viewing on-line, or is being e-mailed, a video presentation of medical results associated with the user (e.g. laboratory test results). The video presentation includes speech audio that recites his results, along with his name and other personal information. Note that since medical results typically vary from person to person, the results information that is spoken will in many cases be personalized. In another example, audio output includes stating the date, time of day information or weather information, all associated with the user's location. In some examples, the video component may include user-specific information, e.g. their photograph, a display that includes their name, gender and similar text information, graphs of their medical test results etc.

Figure 2:
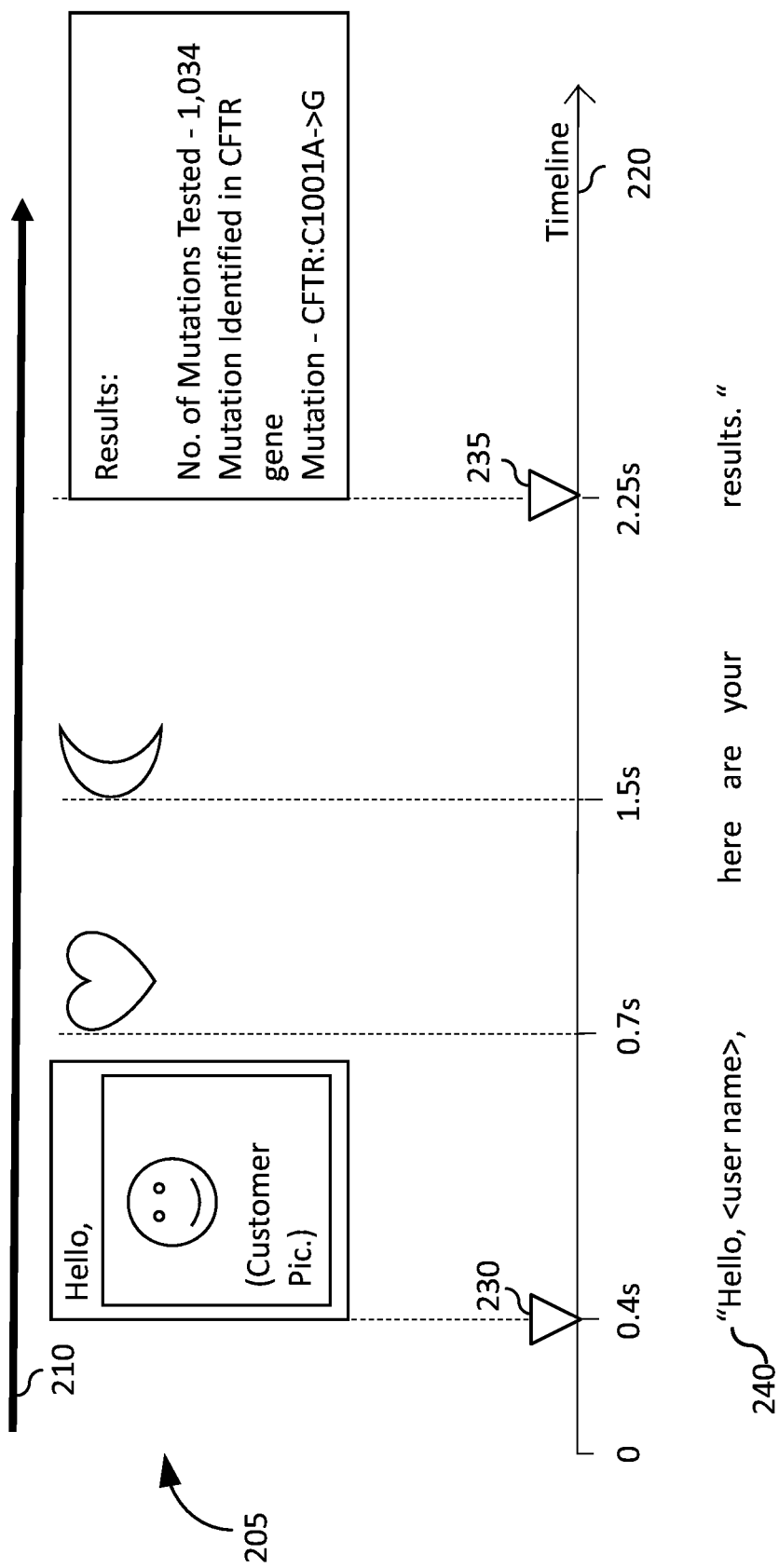
FIG. 2 illustrates a generalized example of multi-media synchronization, in accordance with certain embodiments of the presently disclosed subject matter.

Before continuing with the service flow of FIG. 1, attention is first drawn to FIG. 2, illustrating a generalized example of multi-media synchronization, in accordance with certain embodiments of the presently disclosed subject matter. The figure depicts one example of playing a short video or image slide-show presentation, while playing synchronized speech audio. Arrow 210 indicates the progress of video images along a timeline 220. At 0.4 seconds into the video, the user's picture, along with the text "Hello", are displayed. At 0.7 sec, a heart is displayed. At 1.5 sec, a moon is displayed. At 2.25 sec into the video, the user's medical test results are displayed. The sequence of video items to be displayed, their order and their timing, are in some cases defined in a video media template, exemplified graphically by 205. A video media template is disclosed herein as one non-limiting example of an other-media template.

In parallel with the video playing, also an audio-format modulated composite speech portion is output to the user. The text 240 to be played as audio is "Hello, <user name>, here are your results.", with the user's name inserted in the appropriate place. In order to provide a well-synchronized output to the user, in the example it is determined that the word "Hello" should begin to be spoken at 0.4 sec, in synch with the start of the image of "Hello"+user picture. Also, the word "results" is to be spoken in synch with the "medical results display", at 2.25 sec. The points 230, 235 in time 0.4 sec and 2.25 sec are examples of synchronization points— points in time at which it is desired to synchronize a particular part of a composite speech portion and a particular part of an other media portion such as a video portion. Each such point is associating a point in time in the composite speech portion(s) and a point in time in the other media portion(s). In the example, it is not important for the video service that the heart and moon be displayed in synch with audio output of any particular spoken word, and thus no synch points are defined for those parts of the video.

Spoken text 240 is referred to herein as a composite speech portion, in that it is composed of both speech portions (the texts to be spoken) and gap portions (the pauses or punctuations, e.g. the spaces between words, the commas and the period.) In turn, in some examples the speech portions include both fixed-value speech portions, which do not vary, as well as variable-value speech portions, which can vary. "Hello" and "here" are examples of fixed-value speech portions. The user name is an example of a variable-value speech portion, a varying component of the speech, since the name is different for each user. Other non-limiting examples of variable-value speech portion include the outside temperature and the current time at the user's location, or his measured blood pressure. In some examples, the composite speech portion 240 is associated with a composite speech portion template, disclosed further herein with reference to FIGS. 5A and 7.

Note that in some examples the synchronization point associated with the other-media template (e.g. video media template) indicates where the other media should synchronize with the corresponding, or associated, composite speech portion template.

The presence of variable-value speech portion(s) can in some cases introduce a challenge in attempting to synch between video and speech audio portions. Since a user's name can be "Sue", "David" or "Maximillian", for example, names of different length, it is clear that the time required to speak text such as a user-name field will vary from user to user. Similarly, since a medical result field can have the value "ten" or "three hundred and seventy-seven point five", in some examples the speaking times of a variable-value speech portion can vary, even for the same user, between different individual instances of a video. Thus, without adjustment of the audio speech and/or of the video portion, the audio and video portions can get out of synch, e.g. by milliseconds or seconds.

FIG. 2 is thus, in some examples, a representation of a multi-media item, including a video media portion 205 with an audio-format composite speech portion.

Reverting to FIG. 1, in the example architecture 100, the user utilizes a user device 110 (e.g. via an API) to request 150 their personalized video. User device 110 may be a computer, a tablet, a smartphone, or an information terminal in a medical office, as non-limiting examples. For example, the user may log into a doctor's web site, enter or otherwise input 150 personal information such as name, or user ID and password, and request to see his lab results from a certain date. The request and accompanying information reach a video service system 115, which can be e.g. a server.

In some examples, video service system 115 is connected to two other systems, 120 and 130. The request for the video is sent 155 to a video generator 120, which may also be a server. User inputs 150 in some examples include additional video-related personalized information, e.g. uploading a picture of the user. Such an input is in some examples forwarded to video generator 120.

The relevant user inputs 150 (e.g. personalized information, e.g. user ID or name) are sent 160 by video service system 115 to gap modulation system 130, which in some cases can be a server. Gap modulation system 130 determines the portion of spoken text that will accompany the video output, and the system modulates the playback times of gaps in the text. More details on modulation methods are disclosed further herein. In one example, the system 130 outputs 165 a modulated composite speech portion. In one example, the modulated composite speech portion is output 165 as a text-format modulated composite speech portion, e.g. as text file, for example a Synthesized Speech Markup Language (SSML) file.

Inputs 160 to the gap modulation system 130 include, for example, user inputs 150 entered by the user into the video service system 115, for example in real time. Inputs 160 can also include, in some examples, stored personalized user assets 140 (disclosed further herein). The user assets can be provided directly from storage 140 to system 130, and/or from storage 140 to system 130 via system 115.

In some examples, the modulated composite speech portion, e.g. the SSML file, is sent to, and received by, a text-to-speech (TTS) synthesizer system or engine 135, which can be e.g. a server. In some examples, system 135 synthesizes the modulated composite speech portion 165, which in the example of FIG. 1 is in text format. The output 170 generated by system 135 is in such an example an audio-format modulated composite speech portion 170. The output synthesized speech, which is in an audio format (such as WAV, MP3 etc.), is an example of an audio-format modulated composite speech portion.

The output synthesized speech can be sent 170 for storage in file storage 140. File storage 140 may also store user assets, e.g. personalized and user-customized information. Examples of such information (e.g. location of user residence) are disclosed further herein. File storage 140 is a non-limiting example of a data store 140. In the example of FIG. 1, file storage 140 is in a cloud storage. Note that file storage 140 represents in some cases different storages located at different sites—for example, user name, age and city stored within the video service system 115 and/or within the gap modulation server 130, user medical test results stored at a medical lab, user automobile test results stored at a garage, user reservation information stored at a travel agent etc. In some examples, the relevant assets 140 of a user are accessed utilizing a user name, password or other ID entered as user input 150.

In some examples, video generation system 120 may obtain 175, from file storage 140, video templates 125, as well as the TTS output 170.

In some examples, system 120 also obtains from the file storage 140 one or more personal user asset(s) associated with the user. In some examples, video generation system 120 is a server.

Examples of personal user assets include user picture, user location, weather information associated with the user, time of day information associated with the user, and test results associated with the user. Video generation system 120 may use these assets in generating images or video sequences that are part of the output video. In some examples, personal user asset(s) are associated with the other-media template (e.g. video media template) 205. In the example of FIG. 1, the video media template 205 defines the relative position of media that is indicative of the personal user asset(s) within the other media portion.

For example, the user image may appear in the video, as well as a picture of his city of residence, a display of the temperature forecast for his city, an image of the sun or moon indicating day or night in his location, sun/cloud/rain indicating his local weather etc. The user image and picture of the city are examples of media that is indicative of personal user assets 140. Similarly, data such as the user's medical test results can be presented visually, e.g. as graphs. The example video media template 205 of FIG. 2 defines or specifies synchronization points; that the user image be presented together with the corresponding audio speech at 0.4 sec, that the results and age be presented together with the corresponding audio speech at 2.25 sec etc. The heart and moon of FIG. 2 are examples of components of the video template 205 that are not customized or user-specific. Another example is the dollar-to-euro exchange rate, which may vary for each multi-media output generated, but is not user-specific. Note that in some examples the stored personal user assets 140 enable the video/image component of the output to the user to be customized and personalized to the user.

Note that in some examples, personal user assets 140 can be part of the input 160 to gap modulation system 130. For example, the user's medical results (e.g. pulse="70") may be stored in 140, and these results may be part of the composite speech portion to be modulated by system 130. Note also that some personal assets 140 that serve as part of the input 160 may be fixed for a particular user—e.g. name="Sue", city of residence="Chicago". Some other personal assets may be fixed for a particular personalized multi-media item associated with a particular event (e.g. the pulse that was measured in the May 3, 2018 medical test is always "70", no matter how many times the user asks to view and see an output multi-media item presenting the May 3 test results). Some other personal assets may vary in value every time a personalized multi-media item is generated and is output to the user (e.g. the time of day, and the local weather, at the moment of generating the particular instance of the multi-media output).

Since TTS output 170 has been synchronized with the video templates 125, system 120 may in some cases combine the audio and video into a combined synchronized multimedia output 180, to be presented to the user. In some examples, audio-format modulated composite speech portion 170 is embedded into the video media template, to result in a synchronized multimedia output, capable of presentation to the user.

For example, the video and audio components of the synchronized multimedia output 180 may be played simultaneously to the user over the user device 110. In another example, the user views and listens to the output on a user device that is different from the user device 110 that was used to request the video service.

One non-limiting example of a synchronized multimedia output, such as synchronized audio/video output 180, is an MPEG-4 file that contains both video and audio content, synchronized with each other. Such a file can for example be presented to the user via an application on the user device, or on a web browser. In another example, the output file can be sent to the user in an e-mail, or in another type of message. Another non-limiting example of synchronized audio/video output 180 is a streaming output containing both video and audio. In some examples, the video portion of the file or stream is displayed on a screen, and the audio portion is played over loudspeakers or earphones associated with the user device.

In another example, the audio and video components of output 180 are sent separately by the video generator system 120, not in a single file or stream. In such a case, the two separate components are "combined" at the user device in the sense that, for example, they are played to the user simultaneously. In some cases, the two components of the multi-media content item are presented to the user in two different user playback devices—e.g. the video component displayed on a television screen, and the speech audio component played over loudspeakers placed elsewhere within the user's room.

Note that in some examples, the video template 125 is not modified in order to synch the video component of the output with the audio component of the output. Instead, the composite speech portion is modulated using the dynamic gaps, so as to synch the audio component of the output with the video component of the output.

In the example of architecture 100, the gap modulation system 130 and the video service system 115 are part of the same system, indicated as 132. In another example, the gap modulation system 130 is part of the TTS system 135. FIG. 6B, further herein, discloses one example of such an architecture. In another example, the gap modulation system 130 is a standalone system. In another example, the video generator system 120 is in the same system as the video service system 115. In another example, all systems shown are located on the same server. Other combinations of the systems depicted are possible.

Similarly, in some examples, different information is stored in data store 140. For example, the audio-format modulated composite speech portion 170 can be sent directly from TTS system 135 to video generator 120. In some examples, separate storage is allocated to each system in the figure and may be physically located on each system.

Also note, that the video component of the synchronized multi-media output, disclosed herein, is one non-limiting example of an other-media portion of the synchronized multi-media output, that is a portion of a multi-media output that is other than speech audio. Another non-limiting example of an "other-media portion" is a slide-show of timed images (e.g. JPEG or GIF files), and/or a slide show containing both images and video segments. Like a video content item, these slide-shows display to a user visual information.

Another non-limiting example of an "other-media portion" is mechanical media, involving movement of one or more objects. An example of this is a robot dancing, moving its hands or mouth/lips, or performing other movement, while "speaking" an audio output in synch with the movements, e.g. at an amusement park. Another non-limiting example is a non-video visual media, e.g. a light show that includes "speaking" an audio output in synch with lights of different colors turning on and off. Another non-limiting example is the release of special effects such as smoke, in synch with a system "speaking" an audio output. Another non-limiting example is the playing of music and/or sound effects, in synch with "speaking" an audio output. In another example, various smells are released in synch with spoken audio. Another multi-media output can combine various of the above media elements, and/or others, with synchronized speech output—e.g. an object moving while a video is displayed on a screen, and one or more parallel speech audio outputs are played, all synchronized. Note also, that in some examples, the speech portion can be a sung speech portion.

Figure 3:
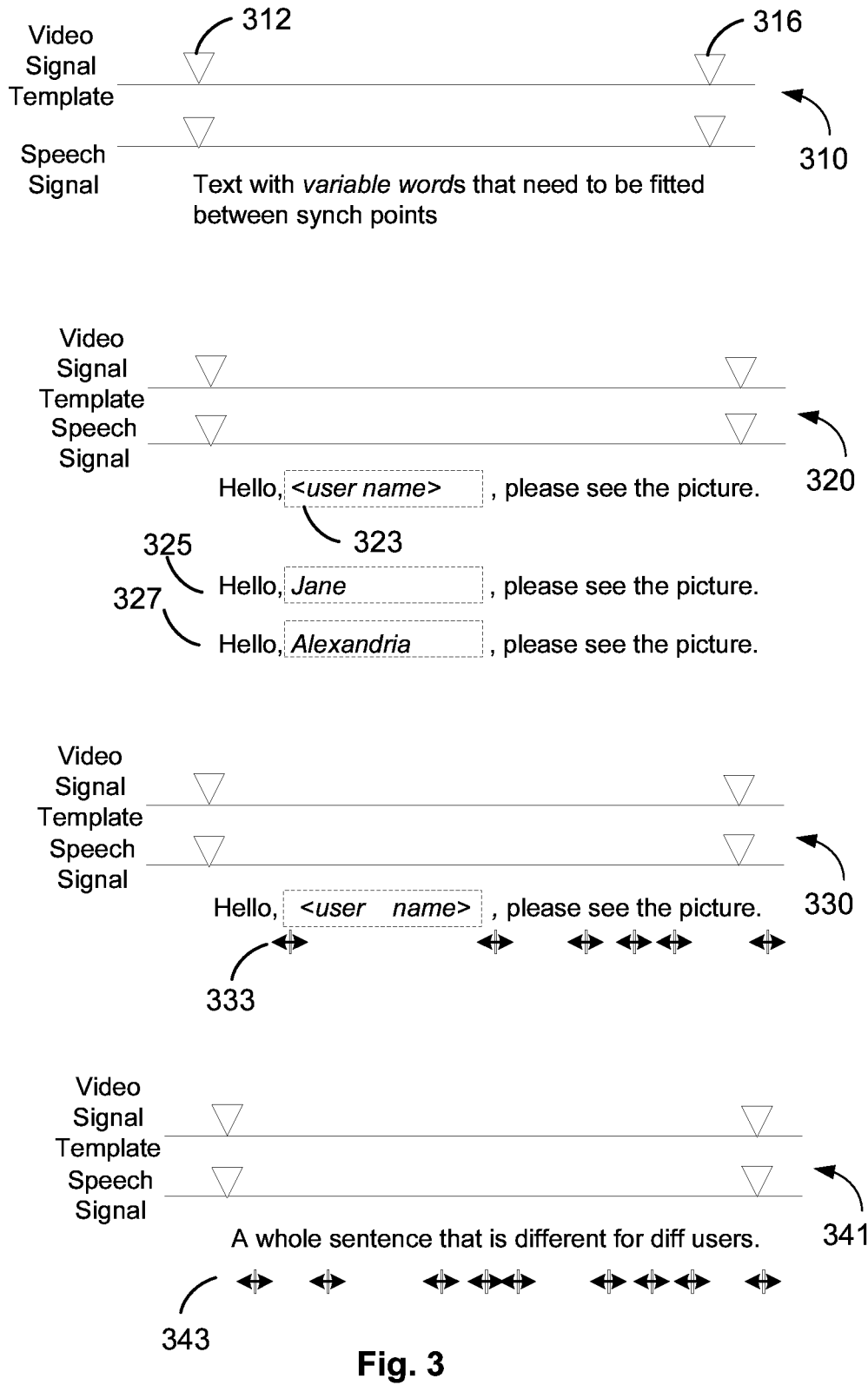
FIG. 3 illustrates generalized examples of multi-media synchronization solutions, in accordance with certain embodiments of the presently disclosed subject matter.

Attention is now drawn to FIG. 3, illustrating generalized examples of multi-media synchronization solutions, in accordance with certain embodiments of the presently disclosed subject matter. Reference 310 shows the playing of both the video and speech audio signals, on the same timeline. Two example synch points 312 and 316 are shown. Text that contains variable-value speech portions will have to be spoken at a rate that synchs up the audio with the video, at least at points 312 and 316.

Timeline 320 shows an example of one solution that does not utilize dynamic-gap modulation. The user name to be spoken in 320 is an example of a variable-value speech portion. Box or window 323 corresponds to a fixed amount or length of playback time allocated by the solution to speak the user name, for example 2 seconds. Since a fixed amount of time is allocated, by a fixed-length window method, for the playback time of the audio output of each variable-value speech portion, and since in some cases the audio output playback time of each fixed-value speech portion and each gap portion is also fixed, synchronization at the two synch points is achieved. In the case 327 of the name "Alexandria", speaking the name requires e.g. 1.8 seconds, and 0.2 seconds of silence will be appended by the text to speech synthesizer (for example), in order to use up the allocated 2 seconds and to achieve synch. However, in case 325, the name "Jane" requires only 0.5 seconds (for example) to speak, and thus the solution will append 1.5 seconds of pause (e.g. silence or comfort noise) after Jane's name, a comparatively long time with no speech occurring. In some examples, this may yield a composite speech portion that is unnatural sounding, in some cases unpleasant and awkward to the listener, with a noticeable pause in the speech.

In another solution, exemplified by timeline 330, the user-name field is spoken in the amount of time required, with no fixed time window allocated. Instead, the solution modulates the gaps. That is, the length or amount of audio speech playback time allocated to each pause or punctuation mark is varied, so that the total length of time between the synch points 312 and 316 is maintained constant, as much as possible. The modulation performed can be increasing gap playback time associated with each dynamic gap, or decreasing the gap playback time. The increase and decrease in the time allocated to each gap is indicated by the references 333. The gaps and blank spaces between words, phrases, sentences etc. can be viewed in some examples as "accordions", in that their allocated length can expand, and can contract/compress, as needed to achieve synch. These gap portions may be referred to herein also as dynamic-gap portions, in that the length of their associated audio output may be modulated and varied in a dynamic way, and that the length may change from video to video. In some examples, such modulation can facilitate improved synchronization of composite speech portion(s) and other media portion(s) at the synchronization point(s). In some examples, this can be done without requiring modulation, or other manipulation or modification, of the speech portions of the composite speech portion.

Timeline 341 shows a generalization of timeline 330. Any sentence (or phrase, or paragraph, or a longer speech portion) can be synched at synch points to the other-media portion (e.g. the video defined by a video signal template) by modulation of one or more dynamic-gap portions 343.

Note also that in the example of FIG. 3, two synch points are shown. In other examples, there can be one synch point, or more than two synch points. In some examples, the start and/or the end of the composite speech portion (and of the corresponding video component) can serve as synch points. For example, in some cases 330 and 205 show only one sentence out of a larger composite speech portion. In some examples of such a case, the composite speech portion is to be synched at synch point 316 and at the end of the entire composite speech portion (not shown). In some examples, composite speech portion has two synch points, the start and the end, and the composite speech portion need synch with the corresponding video component only at the start and end, and not at intermediate points.

Similarly, in the example there is only one variable-value speech portion (user name), and several fixed-value speech portions and dynamic-gap portions. However, in other examples, there can be several variable-value speeches portions in one composite speech portion, e.g. name and temperature and city of residence and test results. In one other example, the composite speech portion can be as short as comprising only one variable-value speech portion and one dynamic-gap portion, e.g. "<user name>!".

Also, English speech is presented, only as an example, but other examples can utilize other languages, or even combinations of languages.

In some examples, dynamic-gap modulation can be performed without consideration of the types of dynamic gaps in the composite speech portion. For example, each dynamic gap may be modulated (expand or compress playback time) by an equal amount (e.g. 0.1 seconds is added to each of 3 dynamic-gap portions, to reach a total of 0.3 sec expansion). In another example, the total modulation time required can be allocated randomly among the dynamic-gap portions (e.g. randomly determine that 0.25 sec is to be added the first gap, 0.05 sec is to be added to the second gap, and 0 sec is to be added to the third gap, again to reach a total of 0.3 sec expansion). Another implementation is now disclosed.

Attention is now drawn to FIG. 4, illustrating one generalized example configuration for multi-media synchronization solutions, in accordance with certain embodiments of the presently disclosed subject matter. FIG. 4 exemplifies an implementation that in some cases can result in a more administrator-controlled modulation of dynamic gaps, and that in some examples is more optimized, in terms of a goal of a natural-sounding modulated composite speech portion, as compared to equal-allocation or random-allocation implementations.

Example configuration table 410 defines the "accordion" parameters associated with each type of dynamic-gap for which the gap modulation system 130 may have to perform modulation. The parameters are minimum limit 430 of compression, and maximum limit 435 of expansion, of the time interval in audio speech for that dynamic-gap type. Increasing the gap playback time is limited by the maximum playback time, and decreasing the gap playback time is limited by the minimum playback time. Playback time may refer herein to the time interval during which the TTS system 135 synthesizes a dynamic-gap into audio, for example into silence. The length of the various gap playback time parameter values is a function of the dynamic-gap type. For example, periods typically indicate the end of sentences, and thus a temporary stop in speech, yielding a longer pause in speech than a comma or space or syllable break.

In the example table, the audio output time that will be allocated to a paragraph break is a minimum gap playback time of 0.5 sec and maximum gap playback time of 5 sec. In some examples, when performing modulation of dynamic-gap portions so as to synch up a composite speech portion at synch point(s), while accounting for the varying audio lengths associated with variable-value speech portion(s), the gap modulation system 130 can allocate anywhere between 0.5 to 5 sec to each paragraph change. On the other hand, commas typically represent a smaller "pause" or "break" in human speech than do paragraphs, and thus the min and max limits allocated in the example table 410 are shorter, 0.1 to 0.9 sec.

Note that in addition to the traditional punctuation marks, example configuration table 410 also enables defining dynamic-gap portion limits associated with spaces, that is gaps between words that have no punctuation mark between them, as well as gaps or breaks between syllables of a word. In some examples a dynamic-gap portion can be a phoneme break between phonemes of a word. In addition, table 410 discloses the option of defining one or more administrator-defined gaps or accordions. In the example, an administrator can define and configure double period " . . . " as a custom-defined gap. Placing a double-period in, for example, a text template 502 defining a customer speech portion (disclosed further herein), can indicate to the gap modulation system 130 that a dynamic-gap portion exists at that point in the text template, and that its min and max limits of playback time are 0.35 to 4 sec. In some examples, a particular custom-defined gap can be used for a longer pause than any other punctuation mark.

The punctuation marks and gaps of table 410 are non-limiting examples. Others can be defined in addition to them, or in place of some or all of them. In the example of the figure, a plurality of dynamic-gap types are shown. Note also that in one simple example, the configuration has only one dynamic-gap or accordion type. E.g. in one example, the table 410 has a record only for "period" (end of sentence). In that case, the gap modulation system 130 can still modulate the playback times of each period in the composite speech portion associated with a video portion.

In some examples, the configuration 410 includes a default time 440 per dynamic-gap type. This may be an initial playback time value, which is assigned to the audio speech that is associated with each dynamic-gap portion, based on the portion's dynamic-gap type. Expansion and compression of the playback time can in some cases be performed relative to this initial value. In some cases, the default or initial time value can be an average time value, representing an average of the min and max limit 430, 435. In another example, there is no separate configuration 440, but instead the gap modulation system 130 chooses an average of parameters 430 and 435 as an initial or default value for each dynamic-gap type.

In some examples, the configuration 410 includes a priority rank 450 per dynamic-gap type. In the example of FIG. 4, paragraph changes have a high priority of 1, spaces have a relatively low priority of 7 etc. In one example of such an implementation, if modulation of dynamic-gap portions of a higher-priority dynamic-gap type will provide the necessary synching at the synch points, there is no need to modulate dynamic-gap portions of a lower-priority dynamic-gap type. For example, assume a composite speech portion that includes 2 periods and 40 spaces. In order to achieve synch, dynamic-gap portions of this composite speech portion must be expanded by a total of 1.6 seconds. Since periods have a higher priority in table 410 than do spaces, the system starts with default period playback time of 2 sec each (per parameter 440), determines that 2.9 sec is the max limit per period (per parameter 435), and increases the playback time of each period by 1.6/2=0.8 sec. The system modulates each period to have a playback time of 2.8 sec., which is still under the max limit for periods of 2.9 sec. The system has expanded the dynamic-gap portions by 2×(2.8−2)=1.6 sec, and has achieved synch by modulating only the periods (having priority 1). The system thus has no need, in this particular case, to modulate any spaces (having priority 7). Note that in this non-limiting example, the composite speech portion to be modulated includes a plurality (2+40=42) of dynamic-gap portions and a plurality (2) of dynamic-gap types. At least some of the dynamic-gap portions are associated with different or unique dynamic-gap types (period vs space). This is one non-limiting example of modulating the dynamic-gap portions based on a priority associated with each dynamic-gap type of a plurality of dynamic-gap types.

In another example of the above case, there is a need to expand dynamic-gap portions of this composite speech portion by a total of 2.6 seconds. Modulating the two priority-3 periods in such a case will not achieve sufficient synchronization at the synch points, and thus the 40 priority-7 spaces will also be modulated.

In another example, the composite speech portion contains paragraph breaks, periods and question marks. If modulating the paragraph breaks does not achieve sufficient synchronization at the synch points, and since the composite speech portion has no priority-2 double periods, the system will use modulation of both periods and question marks (with shared priority 3) to close as much as possible of the remaining gap in synchronization.

In some examples, the modulation of the dynamic-gap portions can be based on a weight associated with each dynamic-gap type. Parameter 460 of configuration 410 shows different weights associated with, and assigned to, different dynamic-gap types. In some examples, each dynamic-gap type can be associated with its own weight.

In the example of FIG. 4, a budget technique is used. Each dynamic-gap (accordion) type, and/or groups of dynamic-gap types, are associated with a weight 460. The total amount of modulation or adjustment of playback time, required to achieve the desired degree of synchronization at the synch points, may be divided up or allocated among the dynamic-gap types based on the weights, which may be referred to herein also as modulation budgets. In one example, synchronization requires increasing total playback time by 10 seconds. The paragraph changes are to provide 45% (4.5 sec) of this increase, if possible. The double periods, periods, and question marks, all together as a group, are to provide 30% (3 sec) of this increase, and so on.

In the above example, there are 2 paragraph changes. Each should provide 4.5/2=2.25 sec of playback time increase, and thus the playback time of each is modulated, from the default value 440 of 2.5 sec, to a value of 2.5+2.25=4.75 sec playback time, which is still under the max limit of 5 sec defined in 435 for paragraphs. In the example, there are 1 question mark, 3 periods and 0 double periods. Each of these 4 marks should provide ¾=0.75 sec of increase in playback time. Thus, the playback time of each of these punctuation marks within the composite speech portion is modulated, from default values of 2 sec, to 2+0.75=2.75 sec playback time, which is still under the max limits of 2.9 and 3 sec defined for periods and question marks. The other dynamic-gap types provide 15% and 10% of the modulation, as shown in the figure, using calculations similar to the above.

In another example, "paragraph changes" are assigned a weight of 45%, but there is only 1 paragraph break, and 2+4.5=6.5 sec is above the max limit of 5 sec. In such a case, it may be that the portion of expanded playback time of length 6.5−5=1.5 sec, which cannot be provided by paragraph change modulation due to the configured limit, is allocated to the remaining dynamic-gap type groups on a pro-rata basis. For example, the group colons/semicolons/commas is allocated 15%/(30%+15%+10%)=27% of the 1.5 sec, i.e. 0.4 sec of expanded playback time, in addition to the 30%*10 sec=3 sec previously allocated to it. The group "colons/semicolons/commas" is thus allocated a total of 3+0.4=3.4 sec expanded playback time. In another example, there are no paragraph breaks at all, or there are no colons, semicolons or commas, and their assigned contribution to modulation, defined in weights 460, is allocated pro-rata to the remaining dynamic-gap type groups.

In some examples, the modulation can be performed using a combination of priorities 450 and weights 460, associated with dynamic-gap types. In other examples, one or the other is used. In still other examples, neither priority ranks nor weights are used, and it may occur that all dynamic-gap portions of all dynamic-gap types are modulated within their min and max limits 430, 435. The use of such configuration options can in some examples enable modulation of the dynamic-gap portions in a flexible manner.

In the example of FIG. 4, the parameters shown have been disclosed as being configurable. In some cases, the administrator of gap modulation system 130 can configure the parameters, such as minimum gap playback time, maximum gap playback time, default playback time, priority and/or weight associated with each dynamic-gap type. In some examples, a data structure such as 410 is referred to herein also as a priority table 410. In some examples, the priority table 410 configuration is global, that is there is one set of configurations for the entire gap modulation system 130. In some examples, the configuration may be different per category of service (e.g. medical results vs travel agent service, both residing on the same system or platform). In some examples, the configuration may be different per specific video category of the same corporate customer (e.g. the blood results video, vs the digestion results video, both provided by the customer Ace Lab Company to its users). In some examples, it may be that separate configuration is provided per user (e.g. Joe vs Jim), and/or per category of user (e.g. elderly vs young people). In some examples, configurations 410 may be associated with various combinations of the above. In other examples, some or all of the parameters in priority table(s) 410 may be fixed in the system and non-configurable. In still other examples, some or all of the parameters in priority table(s) 410, may be sent to a machine learning module, disclosed further herein with reference to FIG. 8, in order to learn a configuration value.

Figure 5A:
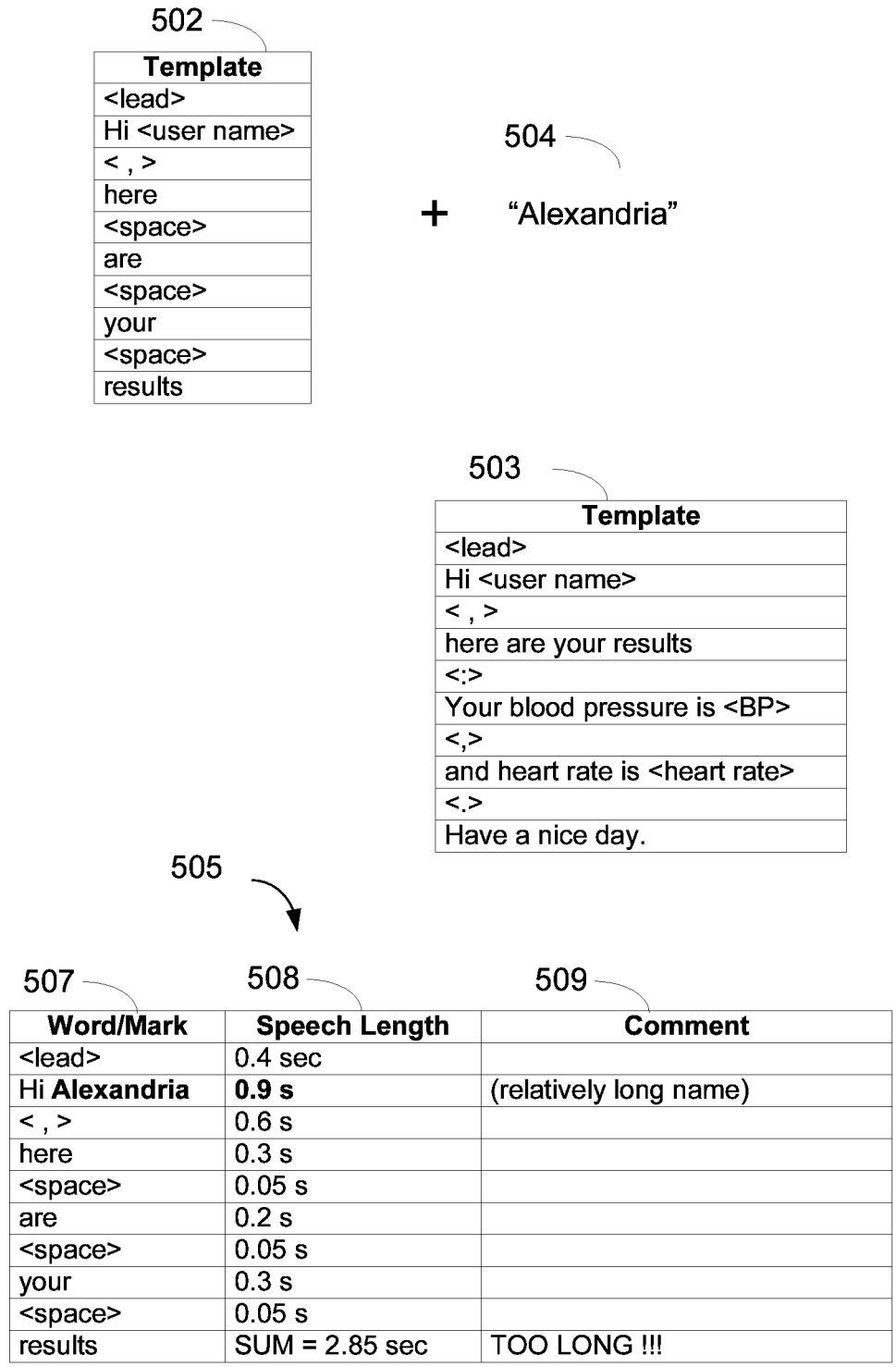
FIG. 5A illustrates a generalized example template and input for multi-media synchronization, in accordance with certain embodiments of the presently disclosed subject matter.

Attention is now drawn to FIG. 5A, illustrating a generalized example template and input 160 for multi-media synchronization, in accordance with certain embodiments of the presently disclosed subject matter. In some examples, a composite speech portion(s) is associated with composite speech portion template(s) 502. The composite speech portion template defines the relative positions of the variable-value speech portion(s), the fixed-value speech portion(s) and the dynamic-gap portion(s). The template can in some cases indicate the existence and position of variable-value speech fields (e.g. "<user name>") within variable value speech-portions (e.g. "Hi <user name>"), the values of which are to be inserted into the variable-value speech portions before modulating and synthesizing.

In some non-limiting examples, the composite speech portion template includes a text template, for example a text file of some sort, or perhaps a portion of a text file (e.g. a line or lines in the file). Non-limiting example template 502 may represent in some cases a text file, with each entry of 502 being a line of the file. The line may, for example, contain a text string of the composite speech portion (both speech portions and dynamic-gap portions), where the text string includes indications which punctuation marks and other gaps are to be treated as dynamic-gap portions. The indication may, for example, be in the form of embedded markups or other metadata. In another example, the entire composite speech portion is one line or text string. In another example, template 502 may represent fields in a database record. In one example, the synch points 230, 235 may appear as markups/metadata within the composite speech portion text string, rather than e.g. in a separate list or database such as 646 (disclosed further herein).

Example template 502 indicates the order of speech output or playback of a particular composite speech portion, e.g. part of an audio stream associated with a video. Template 502 indicates that before speaking, there should be a lead time of silence. (This lead time can in some cases be another dynamic-gap type in FIG. 4, or the lead time can have a fixed value.) The lead time is followed by a variable-value speech portion, composed of the fixed word "Hi" followed by a space and the variable-value field "user name" (whose value can vary). Then follows a dynamic-gap portion, a comma. Then follow several words, each separated by a space (another type of a dynamic-gap portion).

In some examples, such a template can instruct the gap modulation system 130 what words and gaps will have to be synthesized and played back. Note that in some examples, template 502 indicates the order of the various portions, but not the playback time for each. In other examples, template 502 also indicates the playback time for each speech portion.

It should be noted that template 502 exemplifies a variable-value speech portion ("Hi <user name>") that itself contains both variable-value speech fields ("<user name>") and fixed-value speech fields ("Hi"). The two speech fields of this example comprise one speech portion, in that the two fields are to be synthesized and played as-is, without attempting to modulate the playback time of the space between them.

In one example, the text template is based on a template text string(s), with embedded indications of variable-value fields that are to be inserted into the text (e.g. "<insert user name here>") and indications of dynamic gaps (e.g. "<the previous comma is a dynamic gap>").

Note that in some examples, rather than requiring the gap modulation system 130 to consult with e.g. a configuration table such as 410, the markups embedded in the text of a template may have customized configurations for the particular gap of the particular composite speech portion. For example, in a text string in a template, there may appear, after a particular comma, a markup such as "<0.2, 0.7, 0.5, 5>", indicating that the particular comma should have a default playback time of 0.5 sec, may be compressed or expanded within the range of 0.2 to 0.7 sec, and that it has a relative priority of 5 for being modulated. In another example, there may appear, before a word, a markup such as <synch 2.25>, indicating that the following word should be spoken as audio in synch with second 2.25 of the video.

In some examples, system 130 is also provided with the value of variable-value speech field(s) associated with a variable-value speech portion. For example, the system receives 160 the input that the "<user name>" field (a variable-value speech field) has value "Alexandria" 504. Such variable values may for example be part of user-input personal information 150. In some other examples, some variable values may have been previously stored as user assets 140, accessible by gap modulation system 130 and/or by video service system 115. (Note that, for simplicity of the exposition, FIG. 1 does not illustrate the access of data store 140 by system 130). Example scenarios that cause storage in 140 of personalized information include: when the user first went to the medical lab, his personal information was entered and stored at that time, or that he did a registration process e.g. over the web. In at least this sense, the variable-value speech portion can in some cases be user-specific or user-customized or otherwise personalized. It may in some cases be based on user input entered 150 into the video service system 115, and/or on user-associated personal user assets 140.

In some examples, some or all of the personalized information utilized in variable-value speech portions is learned from social media. For example, the system 100 may not have received information on the user's location, but instead learns it from the user's social media. In some examples, such learned information is stored as user assets 140.

In some examples, some or all of the personalized information utilized in variable-value speech portions is located in user-specific health databases. In some examples, these the user-specific health databases include Electronic Medical Records (EMR), also known in some cases as Electronic Health Records (EHR).

In some examples system 130 can use the template information 502, and personalized/customized/variable-value speech field information 504, together with configuration information such as priority table 410 and estimated audio playback times of words and phrases etc. (disclosed further herein), when determining whether modulation of dynamic-gap portions should be performed, and if so, how it should be performed.

Reference 505 shows an example of such an evaluation and determination. The system has assigned an estimated speech length (playback time) 508 with each word or mark 507 in the template 502. In one example, the playback times associated with dynamic-gap portions are the Default Times 440, for example lead time=0.4 sec, comma=0.6 sec, space=0.05 sec. In some examples, the system determines an estimated speech portion playback time for speech portions (fixed-value such as "are" and/or variable-value such as "Hi Alexandria"). In some examples, these estimated speech portion playback times are determined using a machine learning database, as disclosed for example with reference to FIGS. 6A, 7 and 8. Note that the resulting total playback time in the example is 2.85 seconds. This may be too long to allow synchronization with the synch points 230, 235 of FIG. 2, which require a total of 2.25 sec from the start (see comment 509). The overly-long playback time is in this example due to the long name "Alexandria" (see comment 509), such that "Hi Alexandria" has an estimated playback time of 0.9 sec (see bold texts in 505). The result of the evaluation is that modulation will be required, as will be exemplified further herein with reference to FIG. 5B.

Another example template is 503. This example shows that a composite speech portion may in some cases include more than one variable-value speech portion, in this example three ("Hi <user name>", "Your blood pressure is <blood pressure>", "and your heart rate is <heart rate>"). Also, in this example, there are two fixed-value speech portions that are composed of phrases ("here are your results") and even entire sentences ("Have a nice day."), rather than being single words, as in the example of 502. Note that these fixed-value phrases and sentences can in some cases each include multiple words, spaces between the words and even punctuation marks such as a period.

Note also that in the example of 503 it was decided that the period after the heart rate phrase would be a dynamic-gap portion, while the period in the last sentence would be part of a fixed-value speech portion, and not be a dynamic-gap portion. One example rationale for such a configuration choice is that the service provider considers it important for the service that certain phrases or other speech portions such as "Good morning" or "Have a nice day" be played with a constant speech playback time, so as to sound as natural as possible, and therefore prefers to not vary the playback time of the space between "Good" and "morning" (for example). In a configuration such as that of template 503, the service provider or administrator chooses to perform modulation only on the two commas, colon and period shown, in order to achieve synchronization. Similarly, also in 330 of FIG. 3, the administrator could choose to make the speech sequence "please see the picture." a fixed-value speech portion, and to not modulate the gaps within this particular portion.

Note also, that in some examples, the composite speech portion can include a non-speech portion. For example, the audio component of the multi-media can be "Hello <username>", followed by a non-speech portion containing 3 seconds of instrumental music, followed by "Here are your results", followed by a period. In some examples, the non-speech portion does not undergo gap modulation. In some examples, text template 502 includes an indication to play the non-speech portion, e.g. an MP3 file, at a certain point in the composite speech portion. In some examples, the composite speech portion is of audio format, and the instrumental music (the non-speech portion) is part of the audio-format composite speech portion.

Attention is now drawn to FIG. 5B, illustrating a generalized example of dynamic-gap modulation, in accordance with certain embodiments of the presently disclosed subject matter. Tables 510, 525 and 535 show three examples of dynamic-gap modulation, performed for example by gap modulation system 130, each example corresponding to three different lengths of a variable-value speech portion. Columns 515 show the resulting playback times of each portion of the modulated composite speech portion, and columns 518, 530 and 540 describe changes to the accordions/dynamic-gap portions done by the modulation process.

In the example, the playback time of the names David, Alexandria and Sue are 0.25, 0.85 and 0.05 seconds, respectively, while the playback time of the fixed-value speech field "Hi" is 0.05 sec. In the first results table 510, the user's name is David, an "average-length" name Per column 515, it takes 0.05+0.25=0.3 sec to play back that name preceded by "Hi". Using the default playback times 440 for each dynamic-gap portion, the total estimated speech portion playback time is 2.25 sec, which meets the requirements to synch the audio-video synch points of FIG. 2. No modulation is needed, and thus no changes are made in dynamic-gap portions, relative to their default values.

In the second results table 525, the user's name is Alexandria, a "long" name. Per column 515, it takes 0.05+ 0.85=0.9 sec to play back that long name preceded by "Hi" (note the bold). In some examples, evaluation 505 was performed on input template 502 and on input name 504, and the total playback time was determined to be 2.85– 2.25=0.6 sec too long to fit between the synchronization points 230, 235. Modulation is therefore performed, to decrease a total time of 0.6 sec from dynamic-gap portions, while not changing the playback time of variable-value and/or fixed-value speech portions. In column 530, it is seen that the comma playback time was compressed by 0.5 sec to 0.1 sec, its minimum limit 430. In this example, the amount of compression associated with the comma is based on its priority rank 440.

The remaining 0.6-0.5=0.1 sec of required modulation is allocated among the three spaces. The system compresses them by 0.03, 0.03 and 0.04 seconds, to arrive at the three playback times of 0.02, 0.02 and 0.01 seconds—all within the minimum limits 430 for a space. Note that in this example, the budget was not allocated equally: more compression was done on some dynamic-gap portions of a particular dynamic-gap type than was done on the others (0.04 vs 0.03 sec compression). In another example, one space is compressed by 0.4 to its min limit 0.1, then another space is compressed by 0.4 to its min limit 0.1, and the remaining space(s) need only make up the remaining compression time required. In the specified case, the third space would be compressed by only 0.2 sec to 0.3 sec playback time. In still other examples, the modulation budget for the dynamic-gap type (space) can be divided equally, i.e. 0.1/ 3=0.0333 seconds each, giving a dynamic-gap playback time of 0.05–0.0333=0.01667 sec for each space.

In some examples, decreasing the gap playback time is performed in response to the estimated playback time of a part of the composite speech portion being longer than the corresponding other-media playback time associated with corresponding synchronization points. For example, in 525 the unmodulated composite speech portion is of length 2.85 sec, and it is thus longer than the 2.25 sec other-media (video) playback time defined in the video template 205 between the two synchronization points, due to the comparatively longer speech portion playback time of the variable-value speech portion "Hi Alexandria". The length of the speech portion playback time of the variable-value speech portion is in turn due at least partly to the comparatively longer speech field playback time of the variable-value speech field "Alexandria".

In the third results table 535, the user's name is Sue, a "short" name Per column 515, it takes only 0.05+0.05=0.1 sec to play back that short name preceded by "Hi" (note the bold). In some examples, evaluation 505 was performed on input template 502 and input name "Sue", and total playback time sec was determined to be 2.05–2.25=−0.2 sec, i.e. 0.2 sec too short to fit between the synch points 230, 235. Modulation is performed to increase dynamic-gap portions by a total of 0.2 sec, while not changing the playback time of variable-value and/or fixed-value speech portions. In column 540, it may be seen that the comma playback time was expanded by 0.1 sec to 0.7 sec, within its maximum limit 430. In this example, the amount of expansion associated with the comma is based on its weight. For example, the weight 460 may have defined that commas will be allocated 50% of the modulation budget (=0.1 sec), and spaces the other 50%.

The remaining 0.2–0.1=0.1 sec of required modulation is allocated among the three spaces. The system expands them by 0.03, 0.03 and 0.04 seconds, to arrive at the three playback times of 0.08, 0.08 and 0.09 seconds—all within the maximum limits 435 for a comma. Note that also in this example, the budget was not allocated equally: more expansion was done on some dynamic-gap portions of a particular dynamic-gap type than was done on the others (0.04 vs 0.03 sec expansion).

In some examples, increasing the gap playback time is performed in response to the estimated playback time of a part of the composite speech portion being shorter than the corresponding other-media playback time associated with corresponding synchronization points. For example, in 535 the unmodulated composite speech portion is of length 2.05 sec, and is thus shorter than the 2.25 sec other-media (video) playback time defined in the video template 205 between the two synchronization points, due to the comparatively shorter speech portion playback time of the variable-value speech portion "Hi Sue".

As indicated above with reference to FIG. 3, in some examples there are three or more synch points. In one example, at synch point A the spoken user name and user photograph must synch, at synch point B the spoken user test results and a visual chart of the test results must synch, and at synch point C the spoken user blood pressure history and a visual graph of the user blood pressure history must synch. In the same composite speech portion, both decrease and increasing of playback times of dynamic-gap portions are performed, corresponding to different synch points. In one example, the spoken user name is long and the spoken test results are also long, and playback times of the dynamic-gap portions between A and B, and between B and C, are both decreased. In one example, the spoken user name is long and the spoken test results are short, and thus playback times of the dynamic-gap portions between A and B are decreased, while playback times of the dynamic-gap portions between B and C are increased.

In the examples of FIG. 5B, the synchronization was achieved fully (2.25 seconds). In other examples, the modulation improves overall synchronization, but does not achieve full synchronization. In some examples, not all synchronization points will be fully matched synchronized, at a degree of 100%. This may particularly be the case if there are a large number of synchronization points in a single video. In some examples, there are a plurality of synchronization points, and the modulation of the dynamic-gap portions is based on maximizing the number of synchronization points for which improved synchronization will be facilitated. In some examples the modulation of the dynamic-gap portions is based on maximizing the degree of synchronization of one or more synchronization points, in some cases while achieving a lower degree of synchronization of other synchronization points. In some examples, the gap modulation system 130 modulates based on a combination of strategies, considering both the number of synchronization points for which improved synchronization will be facilitated, and also the degree of synchronization to be achieved at each such point. In some examples, the goal is to minimize the overall experience of lack of synchronization, so as to provide video and audio outputs that are optimally synched. In some examples, a goal is a user experience in which the out-of-synch situations are of a small number and degree, and thus are not noticeable. The particular strategy to be used is in some examples based on the particular service.

Note that the modulated composite speech portions 510, 525 and 535 can in some examples be sent 165 as an output file, for example as a text file, e.g. in SSML format, to TTS 135. Note also that the modulated composite speech portions include at least (1) the values of the variable-value speech fields (e.g. the specific names David, Sue etc.), as well as (2) the various dynamic-gap portion playback times determined in the modulation process—two types of information that are not present in the example composite speech portion template 502, which was an input 160 to the gap modulation process.

Three examples of SSML output 165, corresponding to medium, long and short variable-value speech fields (e.g. user names), are as follows:

<speak><break time='400 ms'/> Hi David, <break time='600 ms'/> here are your results</speak>
    <speak><break time='345 ms'/> Hi Alexandria, <break time=' 50 ms'/> here are your results</speak>
    <speak><break time='400 ms'/> Hi Mia, <break time='625 ms'/> here are your results</speak>

(Also note that the above three examples are not identical to those of FIG. 5B.)

In these examples, the synch points are the start and the end of the sentence. In these examples, the "break time" tag defines the playback time for each dynamic-gap portion. These tags will be used by TTS system 135. The playback times of the spoken words, in the above three examples, will be determined by TTS system 135.

Figure 5C:
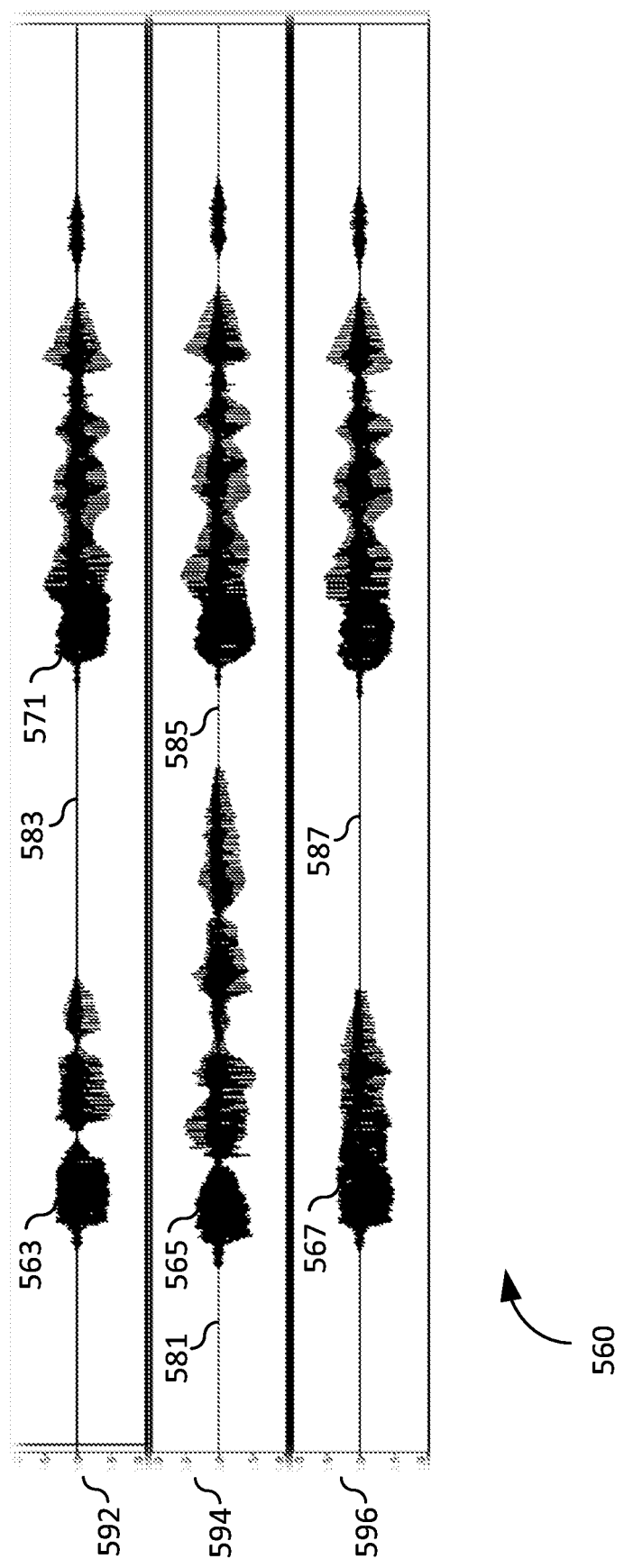
FIG. 5C illustrates a generalized example of a visualization of an audio speech output, in accordance with certain embodiments of the presently disclosed subject matter.

Attention is now drawn to FIG. 5C, illustrating a generalized example of a visualization of an audio speech output, in accordance with certain embodiments of the presently disclosed subject matter. Visualization 560 is a visual representation, along the time axis (left to right), of audio-format modulated composite speech portion outputs 170 of TTS 135, that correspond 592, 594, 596 to the three above examples of SSML 165 that is input to TTS 135.

Visualization 563 corresponds to the audio output for "Hi David", 565 corresponds to "Hi Alexandria", 567 corresponds to "Hi Mia", and 571 corresponds to "here are your results". Note that 565 is longer along the time axis than both 563 and 567, corresponding to the comparatively longer speech playback time for the name "Alexandria". Note also that 565 starts at a somewhat earlier time than do 563 or 567, corresponding to the SSML definition of a "break time" 581 of only 345 milliseconds between the start of the composite speech portion and "Hi Alexandria". (The break times appear in the visualization as flat straight lines, since they correspond to pauses in audio speech.) Similarly, note that break time 587 is somewhat longer than 583, corresponding to their respective SSML definitions of 625 ms and 600 ms break time. Again, it should be noted that break time 585 is considerably shorter than both 583 and 587, corresponding to the SSML definition of only 150 ms break time.

Visualization 560 thus clearly exemplifies modulation of dynamic gap portions 581, 583, 585, 587 based on different estimated playback times of variable-value speech fields, and thus of variable-value speech portions 563, 565, 567. It also exemplifies fixed-value speech portions 571.

Figure 6A:
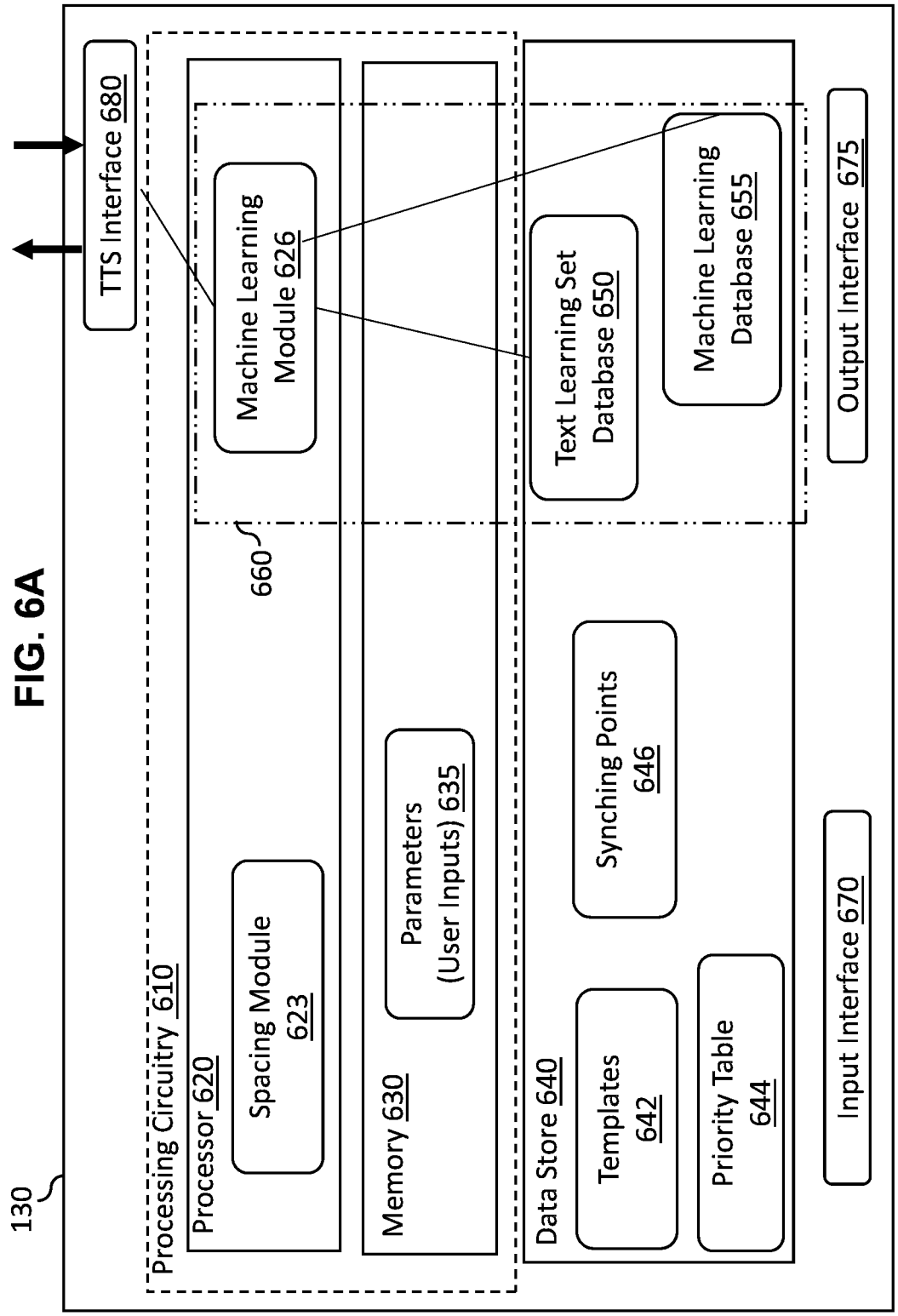
FIG. 6A illustrates a generalized example schematic diagram of a gap modulation system, in accordance with certain embodiments of the presently disclosed subject matter.

Attention is now drawn to FIG. 6A, illustrating a generalized example schematic diagram of a gap modulation system, in accordance with certain embodiments of the presently disclosed subject matter. Gap modulation system 130 may, in certain examples, include a computer. It may, by way of non-limiting example, comprise processing circuitry 610. Processing circuitry 610 may comprise a processor 620 and memory 630.

The processing circuitry 610 may be, in non-limiting examples, general-purpose computers specially configured for the desired purpose by a computer program stored in a non-transitory computer-readable storage medium. They may be configured to execute several functional modules in accordance with computer-readable instructions. In other non-limiting examples, processing circuitry 610 may be computers specially constructed for the desired purposes.

Processor 620 may, in some examples, comprise spacing module 623. Spacing module 630 may in some examples perform at least modulation functions on dynamic-gap portions, such as those disclosed in FIGS. 5A and 5B, as well as those disclosed further herein with reference to flowchart FIG. 7.

Processor 620 may, in some examples, comprise machine learning module 626. Machine learning module 626 may in some examples perform at least machine learning-based estimations of playback time of fixed-value speech portions, of fixed-value speech portions and of dynamic-gap portions. Example functions are disclosed further herein with reference to flowchart FIG. 8.

Memory 630 may in some examples store parameters such as user inputs 635. In some examples, this is user-related information received in 160. This may include, for example, personalized information such as user name and ID entered 150 by the user, and speech texts associated with e.g. weather at the user's location, which were provided by user assets 140. The memory 630 may also store values used in modulation calculations such as those disclosed above with reference to flowchart FIG. 5B.

Gap modulation system 130 may, in certain examples, comprise a data store 640. In some examples, the data store is used to store data items that are of a less-transitory nature than calculation and values and ad hoc user inputs. In some examples, data store 640 comprises the list of synching points 646 associated with the various videos or other other-media portions provided by video service system 115 and video generator 120. Points 230, 235 are non-limiting examples of synching points in 646. Such a list can, for example, include an ID of the video, and a set of points of times within the video that are supposed to be synchronized with the corresponding composite speech portion. In some examples, the synchronization points are defined by e.g. a service provider or a system administrator. In some examples the synch points are determined with the aid of machine learning, matching e.g. visual events and spoken text that is associated with those events (e.g. associating "The temperature is" with a video or still image of a thermometer).

In some examples, data store 640 comprises the templates 642, e.g. text templates of speech, used as a basis for dynamic-gap modulation. 502 and 503 are non-limiting examples of such templates. In some examples, there is a speech template (or more) corresponding to each video service to be output.

In some examples, data store 640 comprises priority table(s) 644. In some examples, priority table(s) 644 are the configuration tables (or other data structures) 410, defining modulation parameters, priorities and/or weights for various dynamic-gap types. In some examples, data store 640 comprises text learning set database 650, and/or machine learning database 655, both used in the playback time machine learning process. Example functions are disclosed further herein with reference to flowchart FIG. 8.

In some examples, all or part of user assets 140 can reside on storage 640. In other examples, user assets 140 reside external to system 130.

Depending on system design, more or less of the data storage may occur in memory 630 or in storage 640. For example, if the capacity of storage 640 is not large enough, some of the data may be stored in 630.

Those skilled in the art will readily appreciate that, like other components of gap modulation system 130, the components of data store 640 can be consolidated or divided in another manner, and that data stores, repositories and databases can be shared with other systems or be provided by other systems. Similarly, references 410, 644, 646, 642 are disclosed herein as being composed of tables, lists and files, for ease of exposition. The structures are non-limiting examples of data structures. Information stored in memory 630, storage 640 and/or user assets data store 140 can in other examples be in the form of trees, arrays, data bases of various types, and any other type of data structures.

Note that in some examples, machine learning module 626 of processor 620, and learning set database 650 and machine learning database 655 of storage 640, are collectively referred to herein as the machine learning functionality 660, indicated in the figure as a broken line. Note that this functionality includes both processing and storage components. Note that in some examples the machine learning functionality 660 also makes use of memory 630. Note also that in some examples, the machine learning functionality 660 resides on hardware different from that of the rest of gap modulation system 130, e.g. on a separate server with separate storage.

Gap modulation system 130 may in some examples comprise a text to speech interface 680 to the TTS system 135. In some examples, spacing module 623 sends 165 modulated composite speech portions over 680. In some examples, machine learning module 626 sends text portions (e.g. words) over 680, and receives back from TTS 135, over 680, synthesized audio outputs. Example functions related to machine learning are disclosed further herein with reference to flowchart FIG. 8.

Gap modulation system 130 may in some examples comprise an input interface 670. In some examples, this interface enables user input 150 of personalized information, and requests, from user device 110. In some examples, this interface enables administrator input to configure the system, e.g. add, delete or modify priority tables 644, templates 642, synching points 646 etc.

Gap modulation system 130 may in some examples comprise an output interface 675. In some examples, this interface enables displaying to the administrator(s) the settings of priority tables 644. In some examples, where the modulated composite speech portion is of audio format, it is output over interface 675 to data store 140.

Attention is now drawn to FIG. 6B, illustrating a generalized example schematic diagram of a gap modulation system within a TTS system, in accordance with certain embodiments of the presently disclosed subject matter. The gap modulation system may in some examples be an audio-to-audio gap modulation module 130A, which is part of a gap-modulating TTS system 135A. In some examples, 135A is a variation of TTS 135, which includes gap modulation functions. Such a gap modulation module 130A can in some examples accept an audio input and generate a (different) audio output.

In some examples, gap-modulating TTS system 135A comprises TTS module 692 and speech-to-speech converter module 694.

In some examples, a text-format composite speech portion 693 is received by the TTS module 692. In some examples, composite speech portion 693 is sent by video service system 115. Note that the text-format composite speech portion 693 in some examples corresponds to the combination of template 502 and variable-value speech fields 504, disclosed with reference to FIG. 5A.

In some examples, TTS module 692 performs text-to-speech synthesis and outputs a non-modulated audio-format composite speech portion 695 to the next module, which is in some examples the speech-to-speech converter module 694.

In some examples, speech-to-speech converter module 694 comprises gap modulation module 130A, similar in function to gap modulation system 130 and capable of audio-to-audio modulation. In some examples, the module 130A analyzes the input audio-format composite speech portion 695, identifies speech portions (e.g. using speech recognition) and identifies gaps between the speech portions. The module may also determine the lengths (playback times) of the received portions. In some examples, module 130A compares the identified speech portions and identified gap portions to a composite speech portion template such as 502 or 503, and it matches fixed-value and/or variable-value speech portions. Note that in some cases, the module 130A has access to personalized information 150 and/or to user assets 140. Module 130A can utilize that information, along with composite speech portion templates such as 502 or 503, to enable recognition and identification of variable-value speech portions. Once speech portions are identified, the gap portions within audio-format composite speech portion 695 may be mapped to dynamic-gap portions that appear in the templates 502, 503.

In one non-limiting example, the TTS module 602 outputs the synthesized audio speech "Hi, Alexandria, here are your results". This audio-format composite speech portion may have a playback time (length) of 2.85 sec, per table 505. Module 130A recognizes the audio speech portions "Hi", "Alexandria", "here", "are", "your" and "results". It sees from user assets 140, for example, that the user name associated with this session of audio/video creation is "Alexandria". It then compares the recognized audio speech portions to template 502. Module 130A thus derives that the pause between "Hi" and "Alexandria" is to be ignored, and also that certain other pauses identified in the audio correspond to the dynamic-gap portions of comma, space, a second space and a third space (all defined in template 502).

In other examples, the module 130A does not compare pauses in the audio input to template 502, but rather has defined default ranges of synthesized audio playback time for each type of punctuation. For example, it is defined in the module that commas typically have a synthesized audio playback time of between 0.5 and 0.7. The module detects in the audio-format composite speech portion a pause of 0.61 seconds, and in the example it guesses that this pause in the audio corresponds to a gap type of comma.

In some examples, audio-to-audio gap modulation module 130A comprises spacing module 623, and it has local or remote access to data stores such as synching points 646 and priority tables 644, as well as to templates 642. It can therefore make dynamic-gap modulation determinations such as exemplified with reference to FIG. 5B, for example utilizing dynamic-gap type parameters 410 corresponding to priority tables 644. In some examples, these determinations of modulation are sent to conversion module 696 of TTS system 135A.

In some examples, conversion module 696 converts the audio-format composite speech portion 695 to a modulated audio-format composite speech portion 170A, which in some examples corresponds to 170 of FIG. 1. The conversion by module 696 of an audio input to a different, modulated, audio output may in some examples make use of the modulation determinations provided by module 130A. In some examples, conversion module 696 does not modify the identified speech portions of 695, and only replaces the identified gap portions with modulated gap portions (each of compressed or expanded length of time, depending on the modulation determinations). In the example, the modulated audio-format composite speech portion may have a playback time (length) of 2.25 seconds, per table 525.

Note that in the above non-limiting example, the composite speech portion templates are text templates, although they are supporting audio-to-audio modulation and conversion. Note also that the process disclosed with reference to FIG. 6B is only a non-limiting example.

Also note, that in some examples of audio-format to audio format gap modulation, the input to gap modulation system 135A may receive audio-format speech, rather than text-format speech. In such examples, TTS module 692 is not required, and is not present. In such examples, 693 and 695 together represent an input of an audio-format composite speech portion.

Gap-modulating TTS system 135A, and/or its components, 692 and/or 694 (including 130A and 696), may in some examples include computer(s). They may, by way of non-limiting example, comprise processing circuitries (not shown). Each such processing circuitry may comprise a processor (both not shown) and memory (both not shown).

Note that in the example disclosed with reference to FIGS. 1, 5A and 5B, the composite speech portions that are processed by gap modulation module 130 are of text format, and the output modulated composite speech portions 165 are also of text format (SSML). The output SSML text file, or in other examples the output text string in a text file, such as those exemplified by 525 and 535, contains the dynamic-gap modulation information (expanded or compressed dynamic-gap playback times), so that the TTS system 135 can synthesize the input text speech to output audio speech using the required playback times. The gap modulation is done within the text "domain".

In contrast, in the example of FIG. 6B, gap modulation module 130A is located within a TTS system 135A, receives composite speech portions 695 of an audio format, and the output modulated composite speech portions 170A are also of an audio format. The gap modulation is done within the audio "domain".

In still other examples, gap modulation system 130 can receive text-format composite speech portions and output audio-format modulated composite speech portions. This may occur, for example, in an implementation where system 130 has an internal TTS engine or server.

In still other examples, synthesis of text to speech by systems 135 or 135A is not required. In one such example, there is a library of prepared audio clips corresponding to, for example, various words and phrases, and pauses of different time intervals. This library could, for example, reside in storage 640. A server or other system, taking the place of 135 or 135A, and in some examples residing within system 130, can receive a text-format modulated composite speech portion, and concatenate stored audio clips of the corresponding speech portions and modulated dynamic-gap portions, to generate an audio-format modulated composite speech portion, without performing speech synthesis.

It should be noted that the term "speech portion" refers in some examples to the fact that it corresponds to verbal content, that is to spoken words, phrases and sentences, which are ultimately output in an audio format that can be presented to a user simultaneously with a video. Note that the term speech portion does not constrain its format during various stages of the processes of, for example, FIGS. 1 and 6B. For example, it has been shown that, depending on the particular implementation, the composite speech portion input to the gap modulation process can be of text or audio format, and that also the modulation composite speech portion output by the gap modulation process can be of text or audio format.

FIGS. 1, 6A and 6B illustrate only a general schematic of the system architecture, describing, by way of non-limiting example, one aspect of the presently disclosed subject matter in an informative manner only, merely for clarity of explanation. It will be understood that the teachings of the presently disclosed subject matter are not bound by what is described with reference to FIGS. 1, 6A and 6B.

Only certain components are shown, as needed to exemplify the presently disclosed subject matter. Other components and sub-components, not shown, may exist. Systems such as those described with respect to the non-limiting examples of FIGS. 1, 6A and 6B, may be capable of performing all, some, or parts of the methods disclosed herein.

Each system component and module in FIGS. 1, 6A and 6B can be made up of any combination of software, hardware and/or firmware, executed on a suitable device or devices, which perform the functions as defined and explained herein. The hardware can be digital and/or analog. Equivalent and/or modified functionality, as described with respect to each system component and module, can be consolidated or divided in another manner Thus, in some embodiments of the presently disclosed subject matter, the system may include fewer, more, modified and/or different components, modules and functions than those shown in FIGS. 1, 6A and 6B. To provide one non-limiting example of this, it was indicated above that in some examples the functions of systems 115, 130, 135, 120 and 140 can be combined in various ways. Similarly, in some examples the synching points information 646 may be included in templates 642. One or more of these components and modules can be centralized in one location or dispersed and distributed over more than one location.

Each component in FIGS. 1, 6A and 6B may represent a plurality of the particular component, possibly in a distributed architecture, which are adapted to independently and/or cooperatively operate to process various data and electrical inputs, and for enabling operations related to signal detection. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

The communication between the various components of the systems of FIGS. 1, 6A and 6B, in cases where they are not located entirely in one location or in one physical component, can be realized by any signaling system or communication components, modules, protocols, software languages and drive signals, and can be wired and/or wireless, as appropriate.

It will be understood that the teachings of the presently disclosed subject matter are not bound by what is described with reference to FIGS. 1, 6A and 6B.

Figure 7:
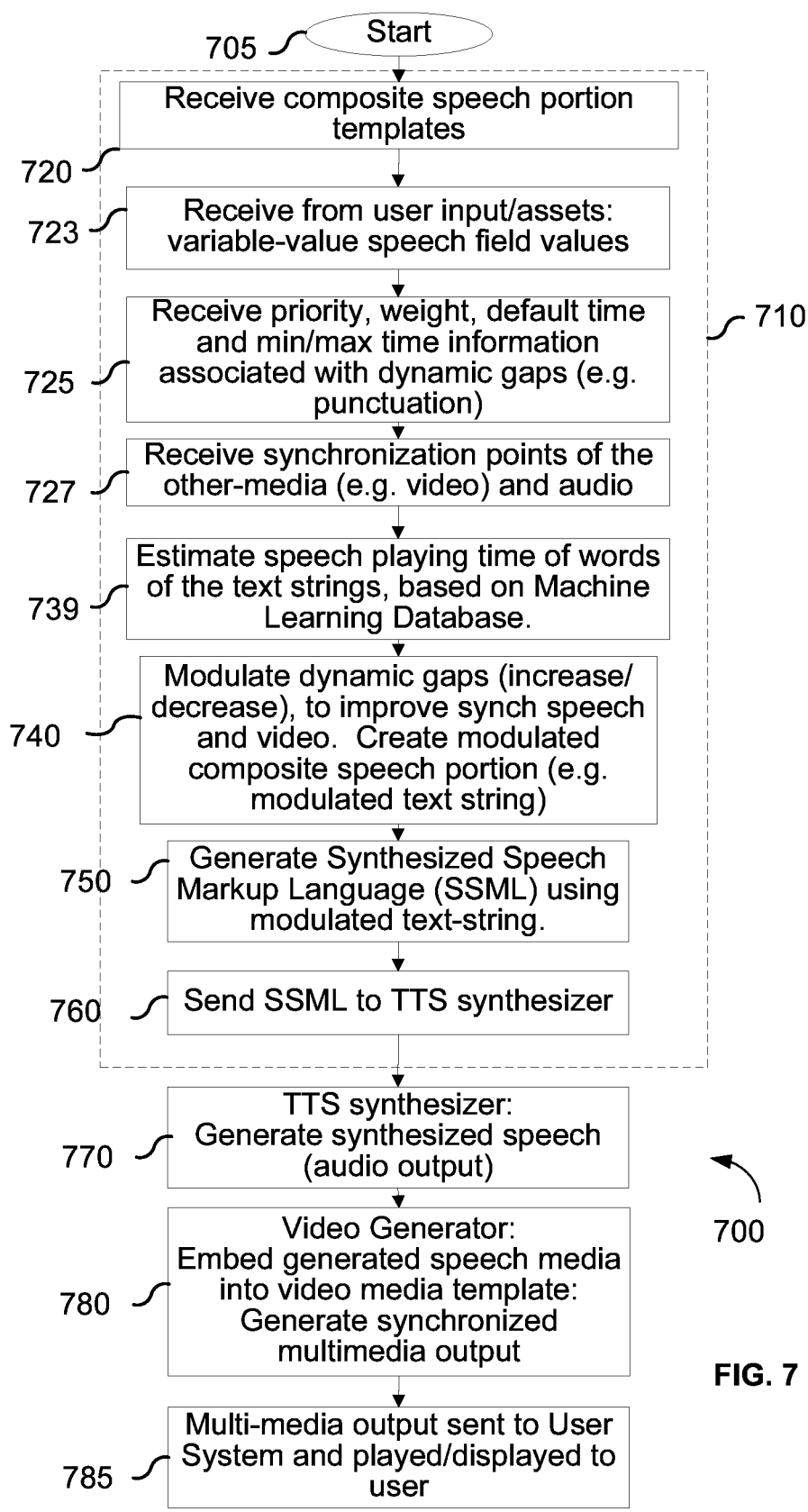
FIG. 7 illustrates one example of a generalized flow chart diagram of a process for dynamic-gap modulation, in accordance with certain embodiments of the presently disclosed subject matter.

A number of exemplary flows are disclosed herein. FIG. 7 discloses an example method of dynamic-gap modulation, while FIG. 8 discloses an example method for estimating playback times using machine learning.

Turning now to FIG. 7, it illustrates one example of a generalized flow chart diagram of a process 700 for dynamic-gap modulation, in accordance with certain embodiments of the presently disclosed subject matter. A methodology that may make use of a system such as 100 may, in some example implementation, include at least some or all of the steps described with regard to FIG. 7.

In some examples, the composite speech portion comprises one or more variable-value speech portions and one or more dynamic-gap portions. In some examples, the composite speech portion also comprises fixed-value speech portion(s). In one implementation, the composite speech portion is associated with one or more composite speech portion templates.

The flow starts at 705. According to some examples, one or more composite speech portion templates are received (block 720). This may be done e.g. by gap modulation system 130, or by audio-to-audio gap modulation system 130A, for example using the spacing module 623 of processor 620. The templates can in some cases define the position of the various speech portions and dynamic-gap portions. They can indicate the existence and position of variable-value speech fields (e.g. "<user name>"), e.g. variable text strings, within variable value speech-portions (e.g. "Hi <user name>"), the values of which are to be inserted into the variable-value speech portions before modulating and synthesizing. These templates are exemplified herein by text-format composite speech portion templates 502 or 503, which for example are stored in templates data store 642.

According to some examples, values of one or more variable-value speech fields are received (block 723). This may be done e.g. by gap modulation system 130, or by audio-to-audio gap modulation system 130A, for example using the spacing module 623. These field values are in some examples the other component of the composite speech portion, in addition to templates 502. In some examples, such variable values are either received as personalized information user input 150 (e.g. user name="David"), and/or accessed by gap modulation systems 130, 130A from user assets data store 140 (e.g. user's city="Dallas, Texas"). In one example, a user ID number received as user input 150 is used as a key, by systems 130, 130A, to match records in user assets 140 and retrieve them as values of variable-value speech fields. In some examples, the variable-value speech field values are received as text strings. In some examples, user inputs to systems 130, 130A are stored in parameters 635 within memory 630, which can then be accessed by spacing module 623.

In some examples, the combination of blocks 720 and 723 (receiving composite speech portion templates and values of variable-value speech fields), together constitute the receiving of one or more composite speech portions. In at least this sense, in some examples the one or more composite speech portion(s) are associated with one or more composite speech portion templates. In other examples, e.g. as disclosed with reference to FIG. 6B, an input to system 130A is an audio-format composite speech portion, templates for identifying the component portions of the-format composite text portion, and user assets from data store 140. In some examples, the audio-format composite speech portion includes audio (e.g. audio of the word "David) that corresponds to values of variable-value speech fields.

In another example, the video service system 115 stores the templates, or accesses them, and sends them, together with the personalized user information of 150 and 140, to gap modulation system 130. In one example, the video service system 115 embeds the personalized variable values into the template, and sends system 130, 130A a single text string or text file, which contains all of the required information (composite speech portion templates and values of variable-value speech fields).

According to some examples, parameters of dynamic-gap modulation are received (block 725). This may be done e.g. by systems 130 or 130A, for example using the spacing module 623. In some non-limiting examples, theses parameters are some or all of those exemplified with reference to 410, e.g. minimum/maximum/default gap playback times, priorities and/or weights, associated with various punctuation marks and other dynamic-gap types. In some examples, the parameters are stored in priority table 644. In other non-limiting examples, they are embedded in composite speech portion templates, in some cases defined per dynamic-gap portion, as disclosed elsewhere herein.

According to some examples, synchronization points 230, 235, associated with times in the audio and other-media (e.g. video) outputs, are received (block 727). This may be done e.g. by systems 130 or 130A, for example using the spacing module 623. In some examples, the parameters are stored in synchronization points 646. In other non-limiting examples, they are embedded in composite speech portion templates, as disclosed elsewhere herein.

According to some examples, audio speech playback times of speech portions are estimated (block 739). This includes playback times of fixed-value speech portions, as well as of variable-value speech portions (comprising, in some cases, variable-value speech fields, fixed-value speech fields, and punctuation/gaps between them). This may be done e.g. by systems 130 or 130A, for example using the spacing module 623. In one example, spacing module 623 requests machine learning module 626 to provide the estimate, which can in some cases include looking up playback time values in machine learning DB 655, and/or sending text strings to synthesis in order to derive playback times. More details are disclosed further herein with reference to FIG. 8. In some examples, the spacing module 623 looks up its own database (not shown) of playback times, and does not utilize machine learning module 626. In still other examples, spacing module 623 utilizes a combination of the above processes. In some examples, estimation of playback times is performed also for dynamic-gap portions. Note that in some examples, block 739 estimates playback times of synthesized speech, before the actual speech audio media is generated by the TTS system 135 in block 770 below.

According to some examples, the dynamic-gap portions are modulated (expanded/compressed, increased/decreased), to facilitate improved synchronization of composite speech portion(s) and the other-media portion(s) at one or more of the synchronization points (block 740). This may be done e.g. by systems 130 or 130A, for example using the spacing module 623. Non-limiting examples of modulation are disclosed with reference to FIG. 5B. In some examples, modulated composite speech portion(s) are generated. In some examples, these are of text-format or audio-format. In some examples, this may include processing an input text string, such that the output text string includes modified information descriptive of modulated playback times of dynamic-gap portions.

According to some examples, SSML is generated corresponding to the text-format modulated composite speech portion (block 750). In this example, the modulation is performed in the text "domain", before audio was synthesized for the composite speech portion(s). This block may be done e.g. by systems 130 or 130A, for example using the spacing module 623. Non-limiting examples of modulation are disclosed with reference to FIG. 5B.

According to some examples, the modulated composite speech portion(s), e.g. Synthesized Speech Markup Language (SSML), are sent 165 to TTS system 135 (block 760). This block may be done e.g. by systems 130 or 130A, for example using the spacing module 623, sending the SSML over TTS interface 680. Note that if the output of the gap-modulation systems 130 or 130A is in audio format, for example as disclosed with reference to FIG. 6B, this step is not needed.

According to some examples, a synthesized speech output 170 is generated for the text-format modulated composite speech portion (block 770). The output is an audio-format modulated composite speech portion. This block may be done e.g. by TTS system 135. In the non-limiting example of FIG. 1, the speech output is sent to data store 140.

According to some examples, an audio-format modulated composite speech portion is combined with a video portion, into a synchronized multimedia output, such that the two portions have improved synchronization at the synchronization points, as compared to the original non-modulated composite speech portion (block 780). This block may be performed e.g. by video generator system 120. In one example, the audio-format modulated composite speech portion is embedded into video media template 125. In some examples, video generator 120 obtains the audio-format modulated composite speech portion from data store 140. Note that in other cases, the other-media portion is e.g. motion of an object, rather than (or in addition to) video. The video media template is thus a non-limiting example of an other-media template.

According to some examples, the synchronized multimedia output is sent to a user device or system, e.g. user device 110 (block 785). This block may be performed e.g. by video generator system 120. In some examples, the synchronized multimedia output is a file, or a stream. The synchronized multimedia output is capable of being presented to the user. For example, video portion of the output can be displayed to the user, while the audio portion of the output is played to the user (e.g. by user device 110).

In some examples, the steps 720, 723, 725, 727, 739, 740, 750, 760 are all performed by gap modulation system 130, or in some examples by audio-to-audio gap modulation system 130A. Such an example is indicated by these blocks being located within broken-line rectangle 710.

Figure 8:
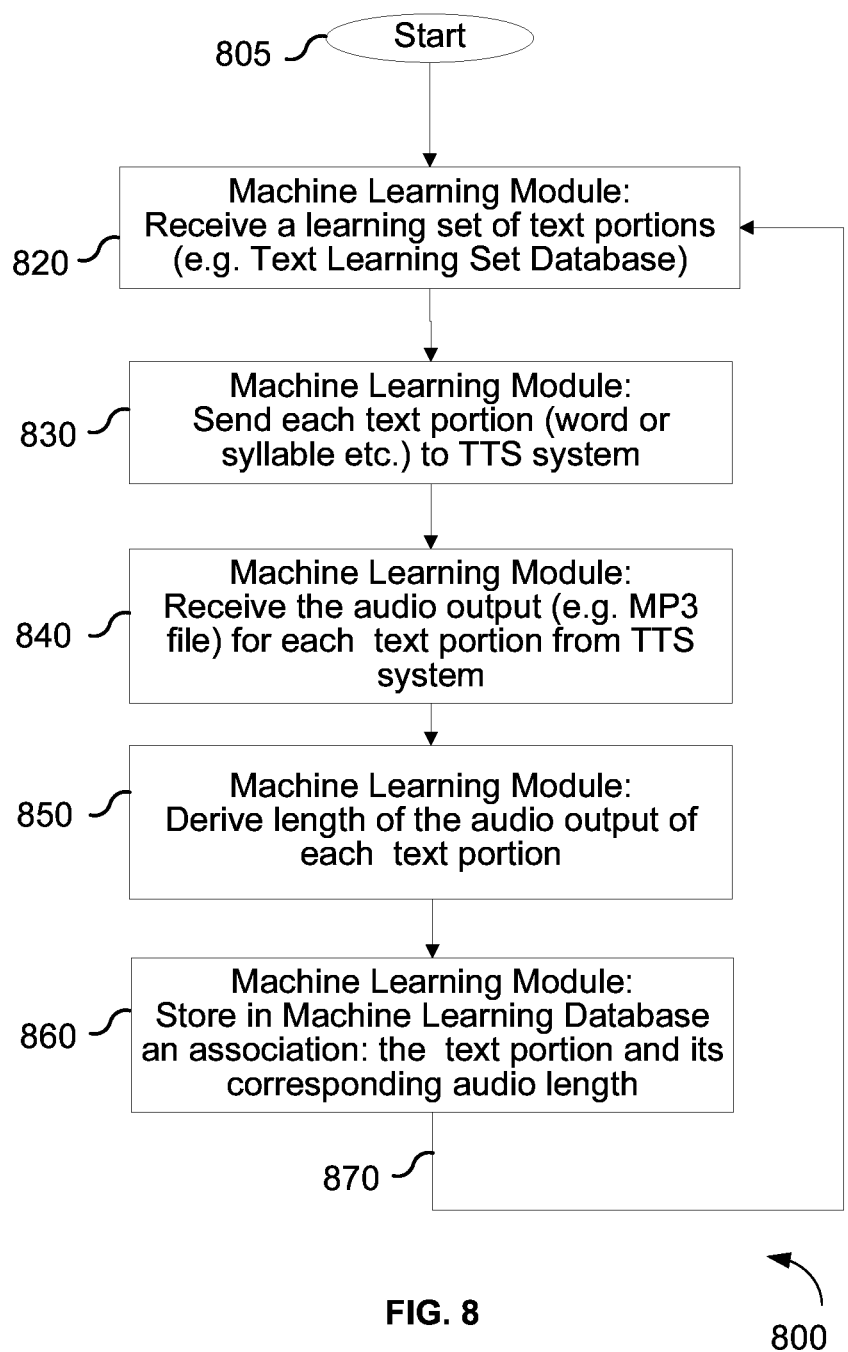
FIG. 8 illustrates one example of a generalized flow chart diagram of a process for playback time estimation, in accordance with certain embodiments of the presently disclosed subject matter.

Turning now to FIG. 8, it illustrates one example of a generalized flow chart diagram of a process 800 for playback time estimation, in accordance with certain embodiments of the presently disclosed subject matter. A methodology that may make use of a system such as 660 may, in some example implementation, include at least some or all of the steps described with regard to FIG. 8. In some examples, process 800 populates the machine learning database 655 with estimated playback times of text portions.

The flow starts at 805. According to some examples, a learning set of text-format speech portions are received (block 820). These may be, for example, text portions, such as text strings, for which audio speech playback times should be estimated. This may be done e.g. by machine learning module 626, within the processor 620 of gap modulation system 130. In some examples, the learning set is received from Text Learning Set Database 650. In some examples, machine learning module 626 receives, from the spacing module 623, the text portions (e.g. words, phrases or entire sentences) for which module 623 wishes to receive estimated playback times.

According to some examples, one or more text portions, of the learning set of text portions, are sent for text to speech synthesis (block 830). This may be done e.g. by machine learning module 626, sending to TTS synthesizer system 135. The sending may be over TTS interface 680.

According to some examples, TTS is performed, and audio output(s) corresponding to the text portion(s), are received (block 840). This may be done e.g. by machine learning module 626, receiving from TTS synthesizer system 135. The receiving may be over TTS interface 680. In some examples, each audio output may be an audio file, e.g. of MP3 format.

According to some examples, the audio output(s) corresponding to the text portion(s), are evaluated, and an estimated length (playback time interval) of each of the audio outputs is derived (block 850). This may be done e.g. by machine learning module 626. For example, in block 830 the name Alexandria was sent to TTS 135, in block 840 the received audio file is analyzed, and its playback time is determined to be 0.8 sec. Information such as this may be an input to the determination that dynamic-gap modulation is required, per example table 505.

According to some examples, an association of the length of the audio output with the text portion is stored (block 860). This may be done e.g. by machine learning module 626, storing the length in machine learning database 655.

According to some examples, the process loops back to block 820, for receipt of the next learning set of text portions, and derivation of their estimated audio speech playback times/lengths (block 870). In some examples, this loop continues until all learning sets have been processed.

The populating of the machine learning database can in some examples facilitate determination 739 of the estimated Speech Portion playback times of composite speech portions. In one example, process 800 is performed up front, at initial set up of the system, to provide estimated playback times for a very large number of words and/or phrases and to have the times available in the database 655 for future queries. In such a case, when in block 739 the gap modulation system 130 wishes to receive estimated playback times for speech and gap portions, it can query DB 655.

In other examples, as a new template 502 is created, for a particular audio/video service, the text portions of 502 are sent to process 800 in order to determine estimated playback times. Similarly, in some examples, when an existing template 502 is updated (e.g. new words are added, the order of sentences changed), the text portions of 502 are sent to process 800.

In one example, once estimated playback times are determined for the relevant text portions, in block 739 of process 700 the gap modulation system 130 queries the database 655 to find the estimated playback time, for fixed-value speech portions and for variable-value speech portions and their component speech fields. In some examples of this, if no record for e.g. the particular word or phrase is not found in DB 655, the system 130 uses process 800 to find the estimate playback time, and also to store the estimated time in DB 655.

In still another example, every time that gap modulation system 130 receives templates and personalized information 150, it submits the text speech portions and speech fields to process 800 for time estimation. Note that when system 130 submits text speech portions for time estimation, those text speech portions function as learning sets. Thus, if a time estimation is submitted to module 626 multiple times for the same word "Here" or the phrase "Here are your results" (for example), module 626 can perform machine learning. Module 626 can analyze, in each turn, each of the TTS outputs for the text portion, determine a playback time, use that playback time to improve accuracy of the estimated playback time, for that word or phrase, and store the updated (improved) time estimate in machine learning database 655. In some examples, this updated time estimate in the DB may be referred to herein as a modified association of the length of the audio output with the text portion. In one example, the value of playback time of the word "Here" in DB 655 is the average of the time estimates associated with numerous TTS conversions of this word. Note that as the estimate playback times in DB 655 become more accurate, via an ongoing process using machine learning, a more accurate determination can be made of the total amount of dynamic-gap portion time that must be modulated, in order to synch a particular text template with synch points of a video template. In some examples, this can enable the dynamic-gap modulation process of system 130 to yield better synchronization.

In this sense, the processes of blocks 820 to 840 can be in some examples part of the normal process of sending input 165 to, and receiving output 170 from, the TTS 135 in FIG. 1.

In still other examples, there is no machine learning database 655, and every time there is a need to estimate playback times, steps 820 to 850 are used to determine the estimated times, using the TTS system.

The above disclosure regarding processes 800 and 739 has related to speech text portions. In some examples, the machine learning process, based on submissions to TTS 135, can be used also to determine estimated playback times for gaps such as punctuation marks, and also these times can be stored in machine learning DB 655. For example, a learning set can include a comma, and a period, and TTS can output an audio of a certain length. In some examples, the playback time of a punctuation mark derived in block 850 can be used to populate default playback time configurations, e.g. 440 in table 410. In other examples, in block 725, the default playback time of punctuation marks can be derived by submitting the punctuation mark in block 830 and receiving a time result in block 850, without consulting a configuration table such as 410.

Note also that machine learning is an example of one way of associating a speech portion or dynamic-gap portion with a playback time interval of speech. In other examples, there can be a database with predefined lengths of time associated with each speech portion or dynamic-gap portion.

Note that some examples of the presently disclosed subject matter provide a mechanism to synchronize two different media, over time, that is to synch the presentation over time of audio media and of one or more other media such as video/slide-shows, motion of objects, dynamic time-based light displays etc. The synchronization causes a re-arrangement of the multi-media stream output by e.g. video generator system 120.

In some examples, multi-media synchronization methods utilizing dynamic-gap modulation of speech, such as disclosed herein, may have at least certain example advantages. Firstly, synchronization of the audio composite speech portion and the other-media speech portion can be achieved, providing a media content item where the audio and the video components start and stop together, and are synchronized in intermediate synchronization points per the service requirements. The case of video is presented herein to exemplify synchronization in general with other-media speech portions. Also, synchronization of the audio and the video in some examples provides an improved user experience, and the sound is output towards the listener's ears in a more synchronized fashion.

Compared to synching methods using fixed-length windows of time 323 for playing variable-value speech portions, as exemplified in 320, the presently disclosed subject matter may arrange the gaps in speech in a more natural-sounding way, over several dynamic-gaps. In addition, in some examples, the modulation in the presently disclosed subject matter utilizes priorities and weights, to allocate the total required pause/gap playback time, in a more controlled and optimized fashion, based on hierarchies of punctuation and gap types, as exemplified in table 410. Dynamic-gap modulation may in some cases make it less detectable that additional pause time has been added, compared to (for example) a solution that uses fixed-time-length windows for variable-value speech portions.

In some examples, for a very long name (e.g. "Mrs. Alexandria O'Donahue-Smith"), whose playback time exceeds the boundaries of the window, fixed-length windows 323 may require truncation or trimming of the speech, whether at the start of or at the end of the speech portion—resulting in an output that does not meet service requirements, as some of the original speech information is cut and is not presented in the output multi-media item. Similarly, if a method using fixed-length windows of time fits variable-value speech portions into the window by speeding up or slowing down the speech portion (thus compressing or expanding the speech portion itself), the output speech portions may in some examples be of a degraded quality compared to the original speech portions. For example, the speech portion may sound unnatural, and in some cases be less intelligible to the listener/viewer.

The designer of the video/audio presentation 320 must thus a-priori choose a fixed-length window 323, and thus must take the risk of either overly-long pauses of speech (or slowdown of the speech) when the name (for example) is a short one, and/or of truncation of speech (or slowdown of the speech), when the name is a long one. In some examples, the presently disclosed subject matter does not suffer from these possible disadvantages, since only the gap portions are modified, dynamically, while the speech portions are not modified.

In some other solutions, the video component of the multi-media item is modified so as to synch with the audio speech component at the synch points. In some examples of such solutions, frames of the video are deleted (e.g. if the video portion playback time is longer than the corresponding audio portion playback time between these synch points). In other examples, the video component is slowed down and/or sped up, as required. In other examples, one or more video frames are displayed for a longer time than the video template indicates, so that the video component "freezes" or "waits" in place, and postpones the start of the following video frame, until the playback of the audio component reaches the synch point. This may occur if e.g. the audio portion playback time is longer than the corresponding video portion playback time between these synch points. The presently disclosed subject matter does not suffer from these possible disadvantages, in some examples, since no manipulation of the video (e.g. changing speed, freezing video frames, or deleting them) is performed.

In still other solutions, the speech portion is played as audio, up to the point of speech corresponding to the next synch point, and a quiet audio delay is inserted at the end of that portion (e.g. if the audio portion playback time is longer than the corresponding video portion playback time between these synch points). For example, there are 10 seconds between synch points, but the corresponding speech portion, which may contain several variable-value speech portions, has a playback time of 6 seconds. The speech audio is played for 6 seconds, following which 4 seconds of silence are appended. The presently disclosed subject matter does not suffer from these possible disadvantages, in some examples, since numerous gap portions within the composite speech portion may be modified, dynamically, rather than appending one long delay at the end of the speech portion. This may in some examples provide an improved audio output, in which the changes in gap playback time are less detectable.

In some embodiments, one or more steps of the various flowcharts exemplified herein may be performed automatically. The flow and functions illustrated in the various flowchart figures may for example be implemented in processing circuitry 610, and they may make use of components described with regard to FIGS. 1, 6A and 6B.

It is noted that the teachings of the presently disclosed subject matter are not bound by the flowcharts illustrated in the various figures. The operations can occur out of the illustrated order. For example, steps 720, 723, 725, and 727, shown in succession, can be executed substantially concurrently, or in a different order. Similarly, some of the operations or steps can be integrated into a consolidated operation, or can be broken down to several operations, and/or other operations may be added. For example, in some cases the templates 502 and the values 504 of variable-value fields are combined in one input, and thus blocks 720 and 723 can be combined.

It is also noted that, whilst the flowchart is described with reference to system elements that realize steps, such as for example processing circuitry 610, this is by no means binding, and the operations can be performed by elements other than those described herein.

In embodiments of the presently disclosed subject matter, fewer, more and/or different stages than those shown in the figures can be executed. In embodiments of the presently disclosed subject matter one or more stages illustrated in the figures can be executed in a different order and/or one or more groups of stages may be executed simultaneously.

In the claims that follow, alphanumeric characters and Roman numerals used to designate claim elements are provided for convenience only, and do not imply any particular order of performance of the elements.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system configured for speech gap modulation, comprising a processing circuitry configured to:

(a) receive at least one composite speech portion, wherein the at least one composite speech portion comprises at least one speech portion and a plurality of dynamic-gap portions,
   wherein the at least one speech portion comprises at least one variable-value speech portion,
   wherein the plurality of dynamic-gap portions are associated with pauses in speech,
      wherein at least one dynamic-gap portion of the plurality of dynamic-gap portions is associated with a dynamic-gap type of a plurality of dynamic-gap types,
      wherein at least one other dynamic-gap portion of the plurality of dynamic-gap portions is associated with another dynamic-gap type of a plurality of dynamic-gap types, the dynamic-gap type and the other dynamic-gap type being distinct,
      wherein each dynamic-gap type of the plurality of dynamic-gap types is associated with a corresponding minimum gap playback time of a plurality of minimum gap playback times,
      wherein the each dynamic-gap type is associated with a corresponding maximum gap playback time of a plurality of maximum gap playback times;
(b) receive at least one synchronization point, wherein the at least one synchronization point is associating a point in time in the at least one composite speech portion and a point in time in at least one other media portion; and
(c) modulate at least one dynamic-gap portion of the plurality of dynamic-gap portions, based at least partially on the at least one variable-value speech portion, and on the at least one synchronization point, thereby generating at least one modulated composite speech portion,
   wherein the modulation of the least one dynamic-gap portion comprises at least one of increasing a gap playback time, associated with the at least one dynamic-gap portion, and decreasing the gap playback time,
      wherein the increasing of the gap playback time is limited by the corresponding maximum playback time,
      wherein the decreasing of the gap playback time is limited by the corresponding minimum playback time,
thereby facilitating improved synchronization of the at least one modulated composite speech portion and the at least one other media portion at the at least one synchronization point, when combining the at least one other media portion and the audio-format modulated composite speech portion into a synchronized multi-media output.

2. The system of claim 1, wherein the modulation of the least one dynamic-gap portion comprises determining an estimated speech portion playback time of the at least one variable-value speech portion.

3. The system of claim 2, wherein the at least one variable-value speech portion comprises at least one variable-value speech field, wherein the estimated speech portion playback time of the at least one variable-value speech portion is based on an estimated speech field playback time of the at least one variable-value speech field.

4. The system of claim 2,
   wherein a part of the composite speech portion comprises the at least one variable-value speech portion,
      wherein an estimated playback time of the part of the composite speech portion is based on the estimated speech portion playback time of the at least one variable-value speech portion,
   wherein the decreasing of the gap playback time is performed in a case in which the estimated playback time of the part of the composite speech portion is longer than a corresponding other-media playback time associated with the at least one synchronization point,
   wherein the increasing of the gap playback time is performed in a second case in which the estimated playback time of the part of the composite speech portion is shorter than the corresponding other-media playback time.

5. The system of claim 2,
   wherein the determining the estimated speech portion playback time of the at least one variable-value speech portion is based on a machine learning database
   wherein the system further configured to:
   (e) populate the machine learning database with estimated playback times of text portions, the populating comprising:
      (A) receiving a learning set of text portions;
      (B) sending to a TTS synthesizer a text portion of the learning set of text portions;
      (C) receiving from the TTS synthesizer an audio output; and
      (D) storing in the machine learning database an association of the length of the audio output with the text portion;
      (E) repeating said steps (B) through (D) for at least the next text portion of the learning set of text portions,
   wherein the populating of the machine learning database facilitates the determining of the estimated speech portion playback time.

6. The system of claim 1,
   wherein the at least one speech portion comprising at least one fixed-value speech portion,
   wherein the at least one composite speech portion is associated with at least one composite speech portion template, the at least one composite speech portion template defining relative positions of the at least one variable-value speech portion, the at least one fixed-value speech portion and the plurality of dynamic-gap portions.

7. The system of claim 1,
   wherein at least two dynamic-gap portions of the plurality of dynamic-gap portions are associated with at least two different dynamic-gap types of the plurality of dynamic-gap types,
   wherein the modulation of the least one dynamic-gap portion is based at least partly on a corresponding priority defined for each dynamic-gap type of the at least two different dynamic-gap types.

8. The system of claim 7, wherein the corresponding priority defined for the each dynamic-gap type is configurable.

9. The system of claim 1,
   wherein at least two dynamic-gap portions of the plurality of dynamic-gap portions are associated with at least two different dynamic-gap types of the plurality of dynamic-gap types,
   wherein the modulation of the least one dynamic-gap portion is based at least partly on a corresponding weight defined for each dynamic-gap type of the at least two different dynamic-gap types.

10. The system of claim 9, wherein the corresponding weight defined for the each dynamic-gap type is configurable.

11. The system of claim 1, wherein the modulation of the least one dynamic-gap portion is based on maximizing a degree of synchronization of the at least one synchronization point.

12. The system of claim 1,
wherein the at least one composite speech portion comprises at least one of a text-format composite speech portion and an audio-format composite speech portion,
wherein the at least one composite speech portion comprises at least one of a text-format modulated composite speech portion and the audio-format composite speech portion.

13. The system of claim 12, wherein said step (a) further comprising receiving the at least one other media portion,
wherein the system is further configured to:
(d) combine the at least one other media portion and the audio-format modulated composite speech portion into a synchronized multimedia output, wherein the synchronized multimedia output is at least one of a files and a stream, wherein the synchronized multimedia output is capable of presentation to a user.

14. The system of claim 1, wherein the at least one other media portion is associated with at least one other-media template,
wherein the at least one other-media template is associated with at least one personal user asset, the at least one other-media template defining the relative position of media indicative of the at least one personal user asset within the at least one other media portion.

15. The system of claim 1, wherein the at least one variable-value speech portion is user-specific.

16. The system of claim 1, wherein the minimum gap playback time, and the maximum gap playback time associated with the dynamic-gap type, are configurable.

17. The system of claim 1, wherein the at least one composite speech portion comprises at least one pause in speech exclusive of the plurality of dynamic-gap portions,
wherein the modulation of at least one dynamic-gap portion ignores the at least one pause in speech.

18. A system configured for speech gap modulation, comprises a processing circuitry configured to:
(a) receive at least one composite speech portion,
wherein the at least one composite speech portion comprises at least one audio-format composite speech portion,
wherein the at least one composite speech portion comprises at least one speech portion and a plurality of dynamic-gap portions,
wherein the at least one speech portion comprises at least one variable-value speech portion,
wherein the plurality of dynamic-gap portions are associated with pauses in speech,
wherein at least one dynamic-gap portion of the plurality of dynamic-gap portions is associated with a dynamic-gap type of a plurality of dynamic-gap types,
wherein at least one other dynamic-gap portion of the plurality of dynamic-gap portions is associated with another dynamic-gap type of a plurality of dynamic-gap types, the dynamic-gap type and the other dynamic-gap type being distinct,
wherein each dynamic-gap type of the plurality of dynamic-gap types is associated with a corresponding minimum gap playback time of a plurality of minimum gap playback times,
wherein the each dynamic-gap type is associated with a corresponding maximum gap playback time of a plurality of maximum gap playback times;
(b) receive at least one synchronization point, wherein the at least one synchronization point is associating a point in time in the at least one composite speech portion and a point in time in at least one other media portion; and
(c) modulate at least one dynamic-gap portion of the plurality of dynamic-gap portions, based at least partially on the at least one variable-value speech portion, and on the at least one synchronization point, thereby generating at least one modulated composite speech portion,
wherein the modulation of the least one dynamic-gap portion comprises at least one of increasing a gap playback time, associated with the at least one dynamic-gap portion, and decreasing the gap playback time,
wherein the increasing of the gap playback time is limited by the corresponding maximum playback time,
wherein the decreasing of the gap playback time is limited by the corresponding minimum playback time,
thereby facilitating improved synchronization of the at least one modulated composite speech portion and the at least one other media portion at the at least one synchronization point, when combining the at least one other media portion and the audio-format modulated composite speech portion into a synchronized multimedia output.

19. The system of claim 18, wherein the processing circuitry is further configured to:
(d) analyze the at least one audio-format composite speech portion;
(e) identify the at least one speech portion based on the analysis; and
(f) identify the at least one dynamic-gap portion based on the analysis.

20. A system configured for speech gap modulation, comprising a processing circuitry of configured to:
(a) receive at least one composite speech portion, wherein the at least one composite speech portion comprises at least one speech portion and a plurality of dynamic-gap portions,
wherein the at least one speech portion comprises at least one variable-value speech portion,
wherein the plurality of dynamic-gap portions are associated with pauses in speech,
wherein at least one dynamic-gap portion of the plurality of dynamic-gap portions is associated with a dynamic-gap type of a plurality of dynamic-gap types,
wherein at least one other dynamic-gap portion of the plurality of dynamic-gap portions is associated with another dynamic-gap type of a plurality of dynamic-gap types, the dynamic-gap type and the other dynamic-gap type being distinct,
wherein each dynamic-gap type of the plurality of dynamic-gap types is associated with a corresponding minimum gap playback time of a plurality of minimum gap playback times,
wherein the each dynamic-gap type is associated with a corresponding maximum gap playback time of a plurality of maximum gap playback times;
(b) receive at least one synchronization point, wherein the at least one synchronization point is associating a point in time in the at least one composite speech portion and a point in time in an at least one other media portion, wherein the at least one synchronization point comprises a plurality of synchronization points; and (c) modulate at least one dynamic-gap portion of the plurality of dynamic-gap portions, based at least partially on the at least one variable-value speech portion, and on the at least one synchronization point, thereby generating at least one modulated composite speech portion, wherein the modulation of the least one dynamic-gap portion comprises at least one of increasing a gap playback time associated with the at least one dynamic-gap portion, and decreasing the gap playback time, wherein the increasing of the gap playback time is limited by the corresponding maximum playback time, wherein the decreasing of the gap playback time is limited by the corresponding minimum playback time, thereby facilitating improved synchronization of the at least one modulated composite speech portion and the at least one other media portion at the at least one synchronization point, when combining the at least one other media portion and the audio-format modulated composite speech portion into a synchronized multimedia output, wherein the modulation of the at least one dynamic-gap portion is based on maximizing a number of synchronization points for which improved synchronization will be facilitated.

\* \* \* \* \*